Patented Feb. 11, 1947

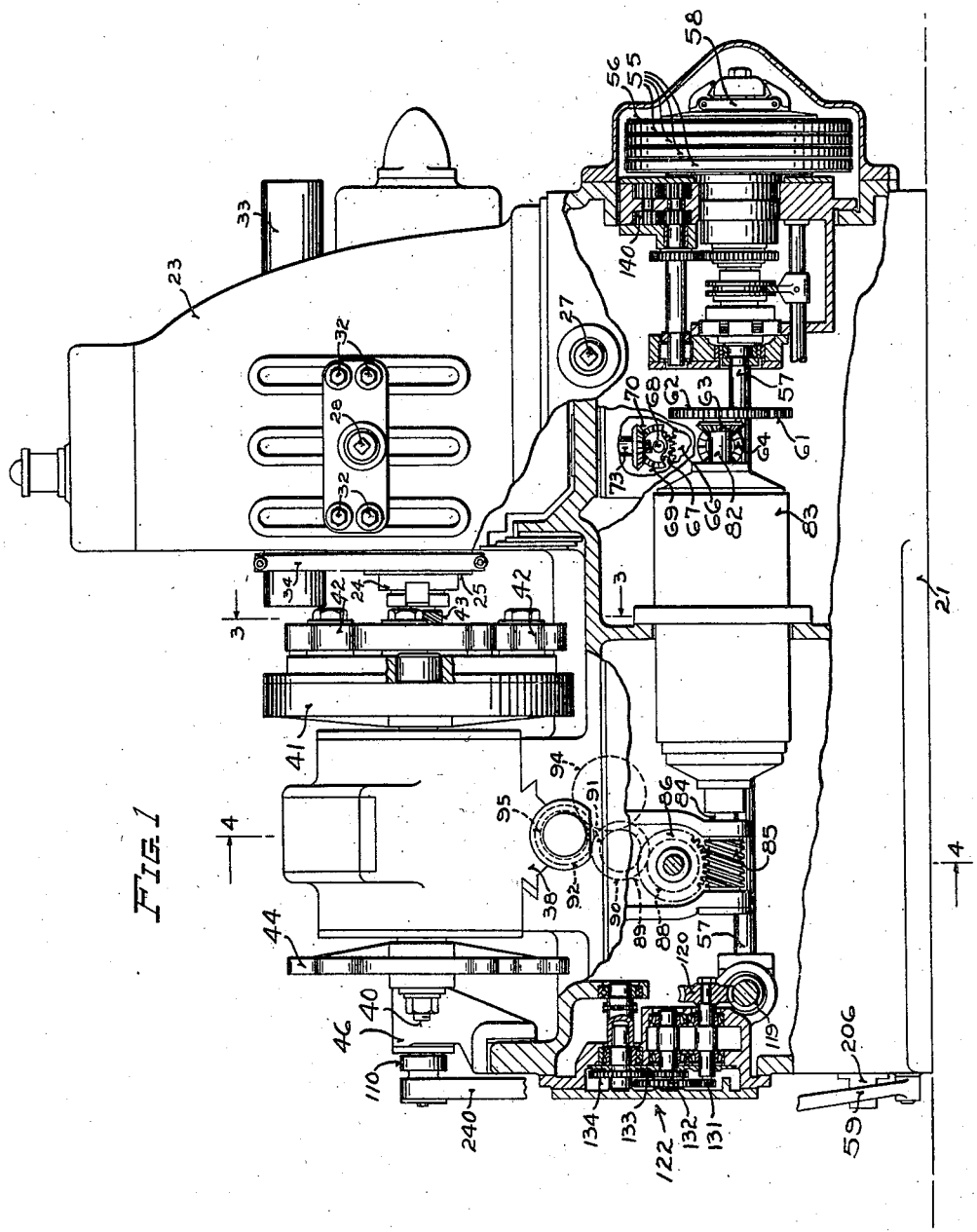

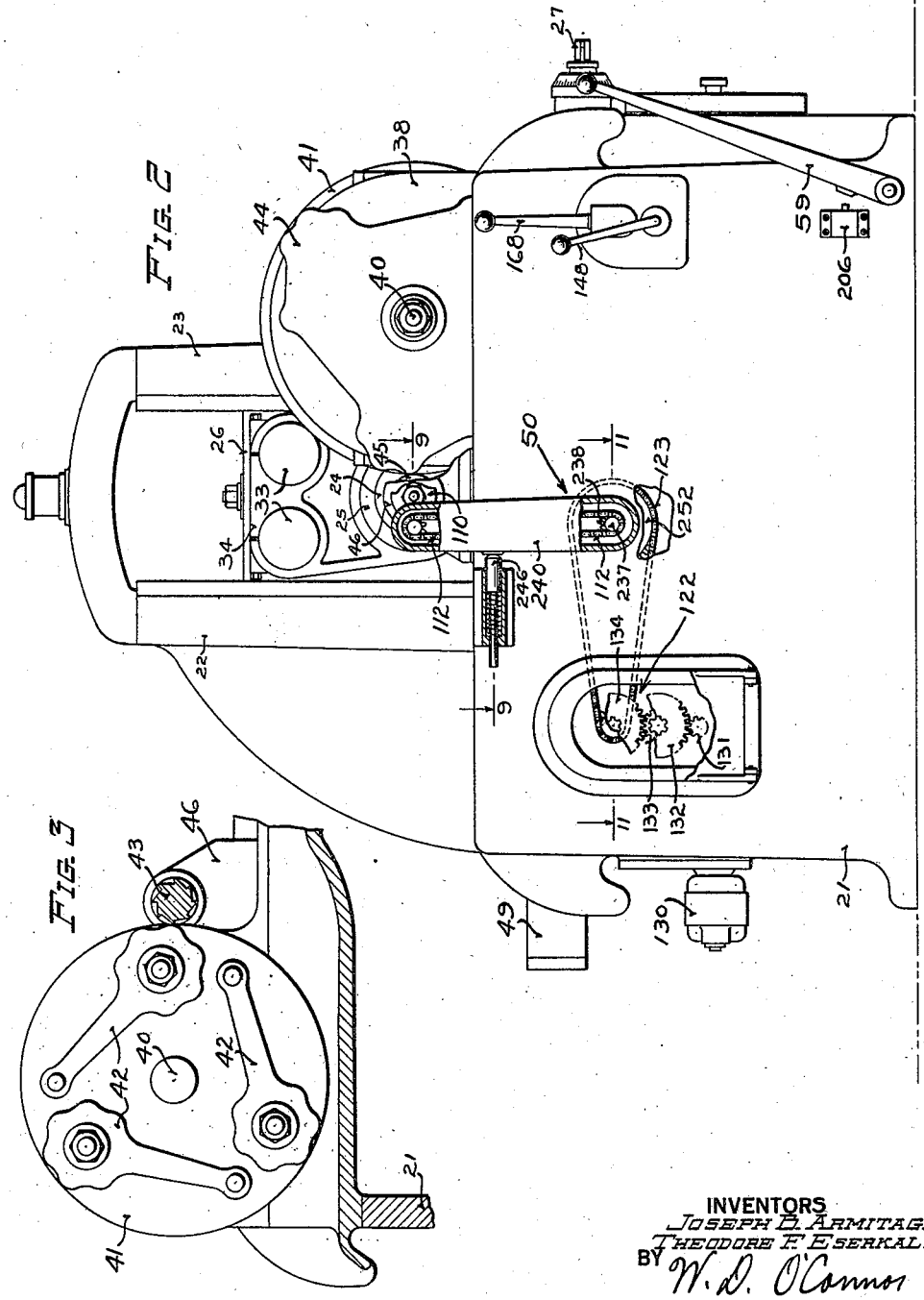

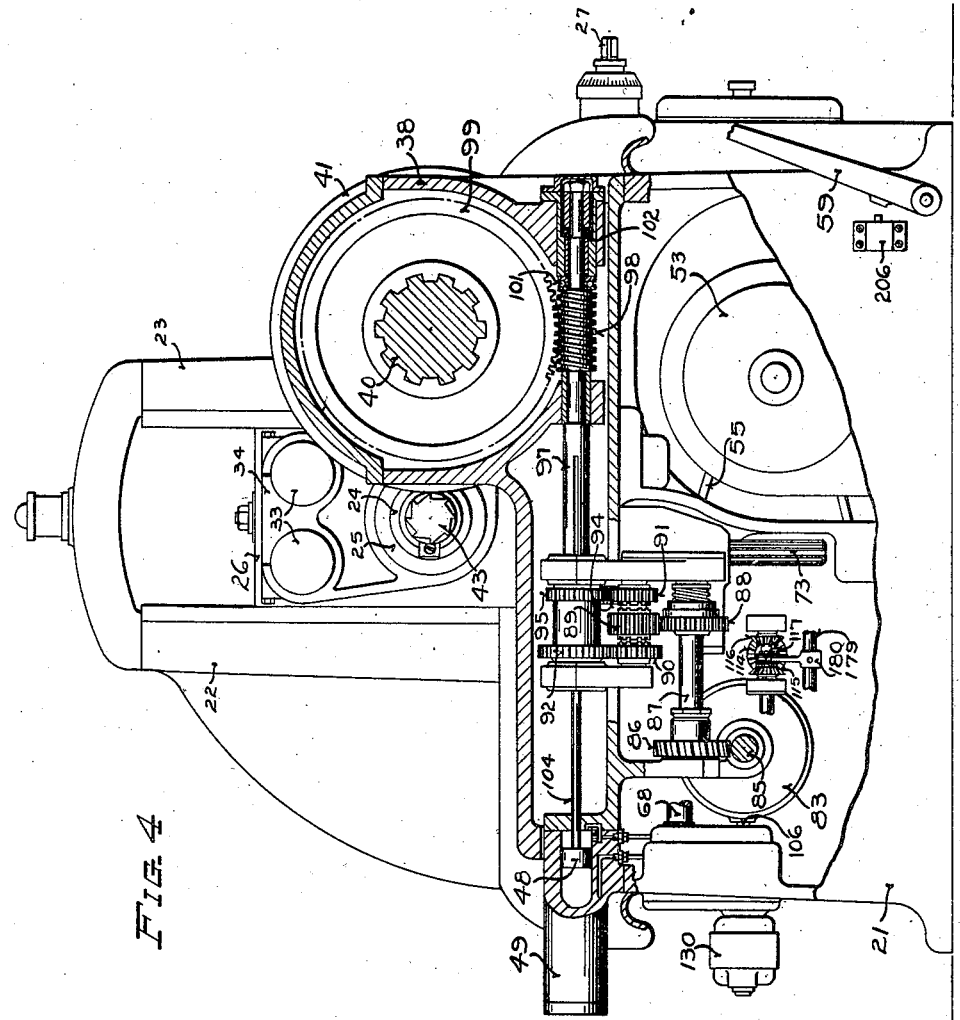

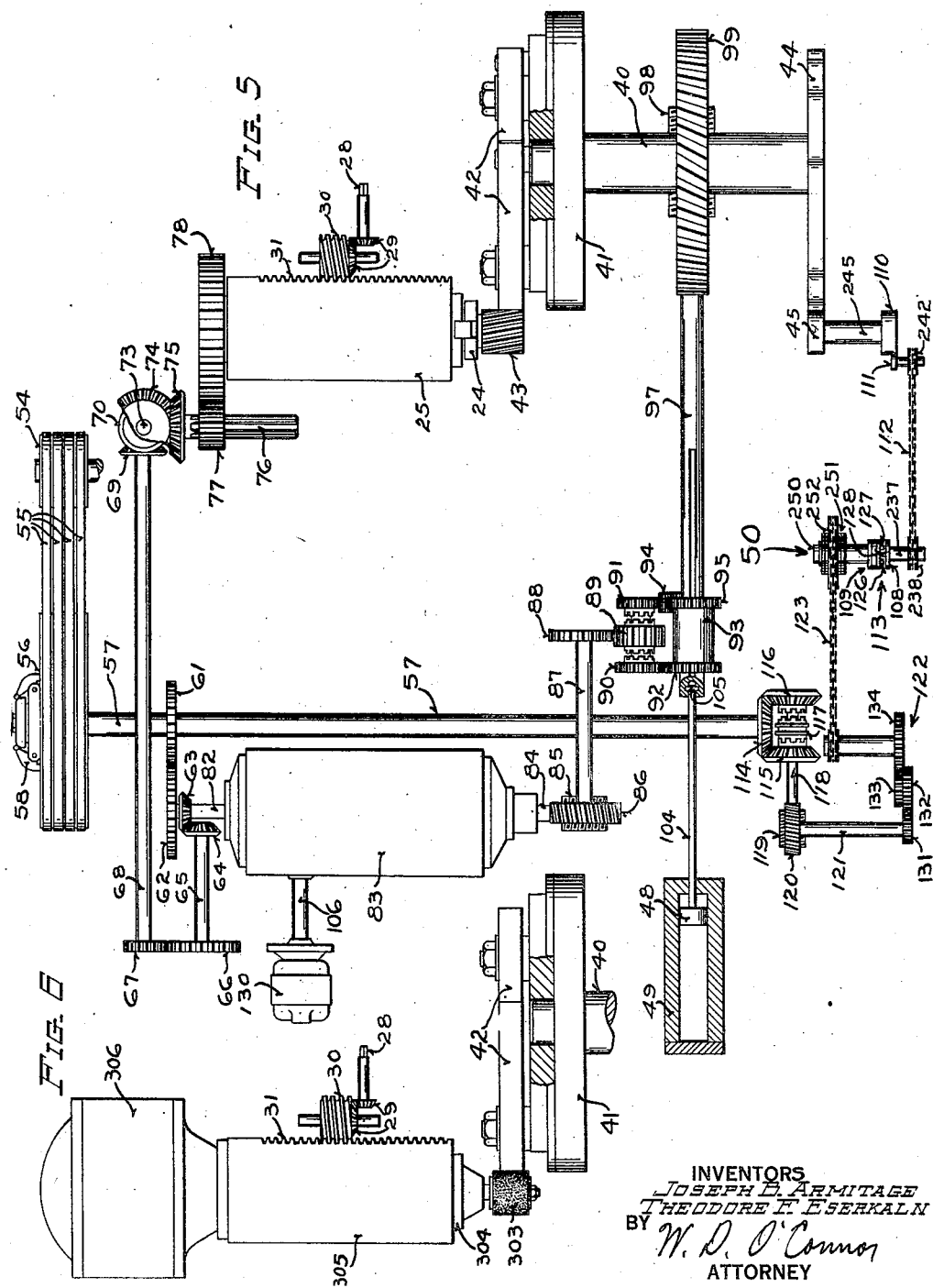

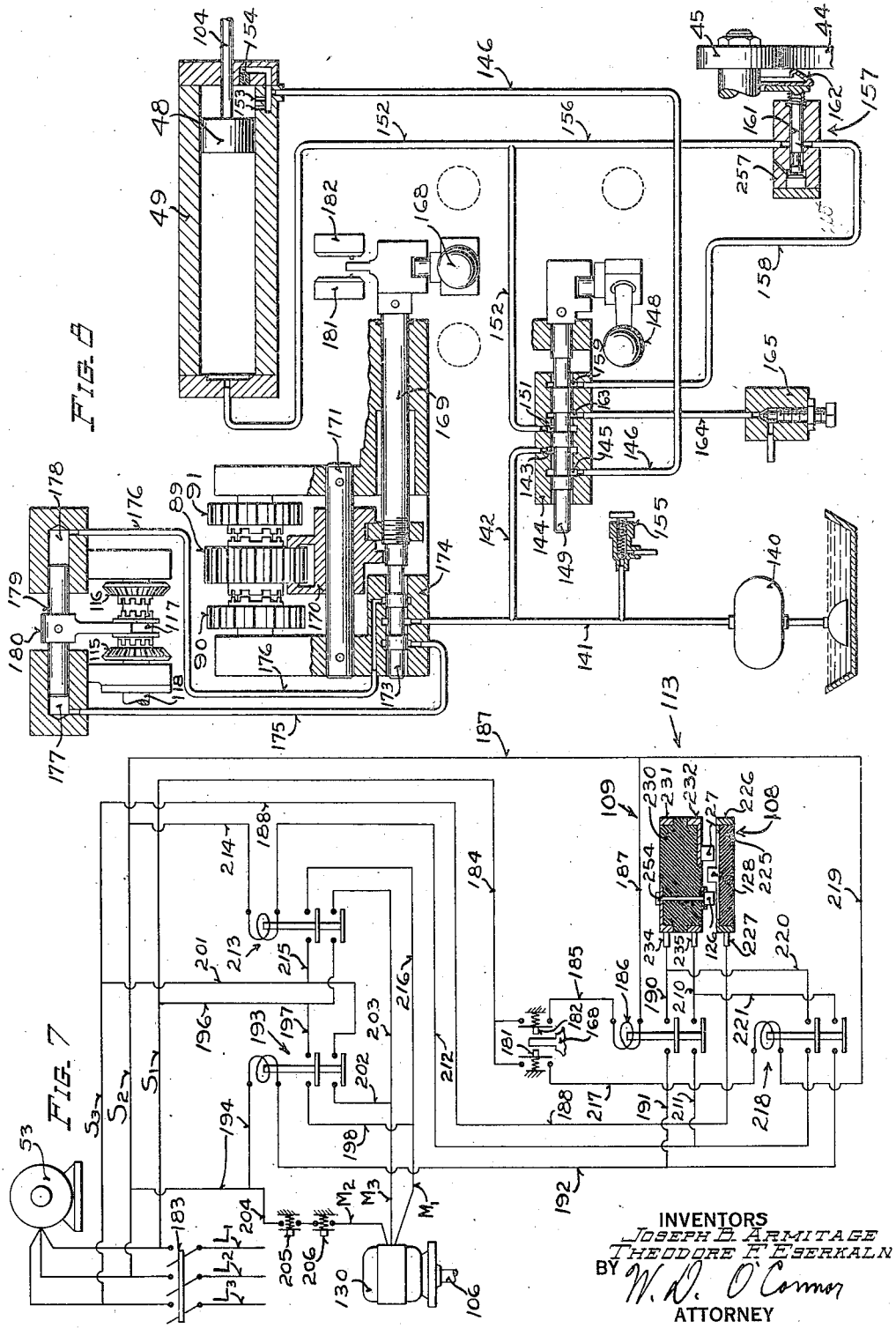

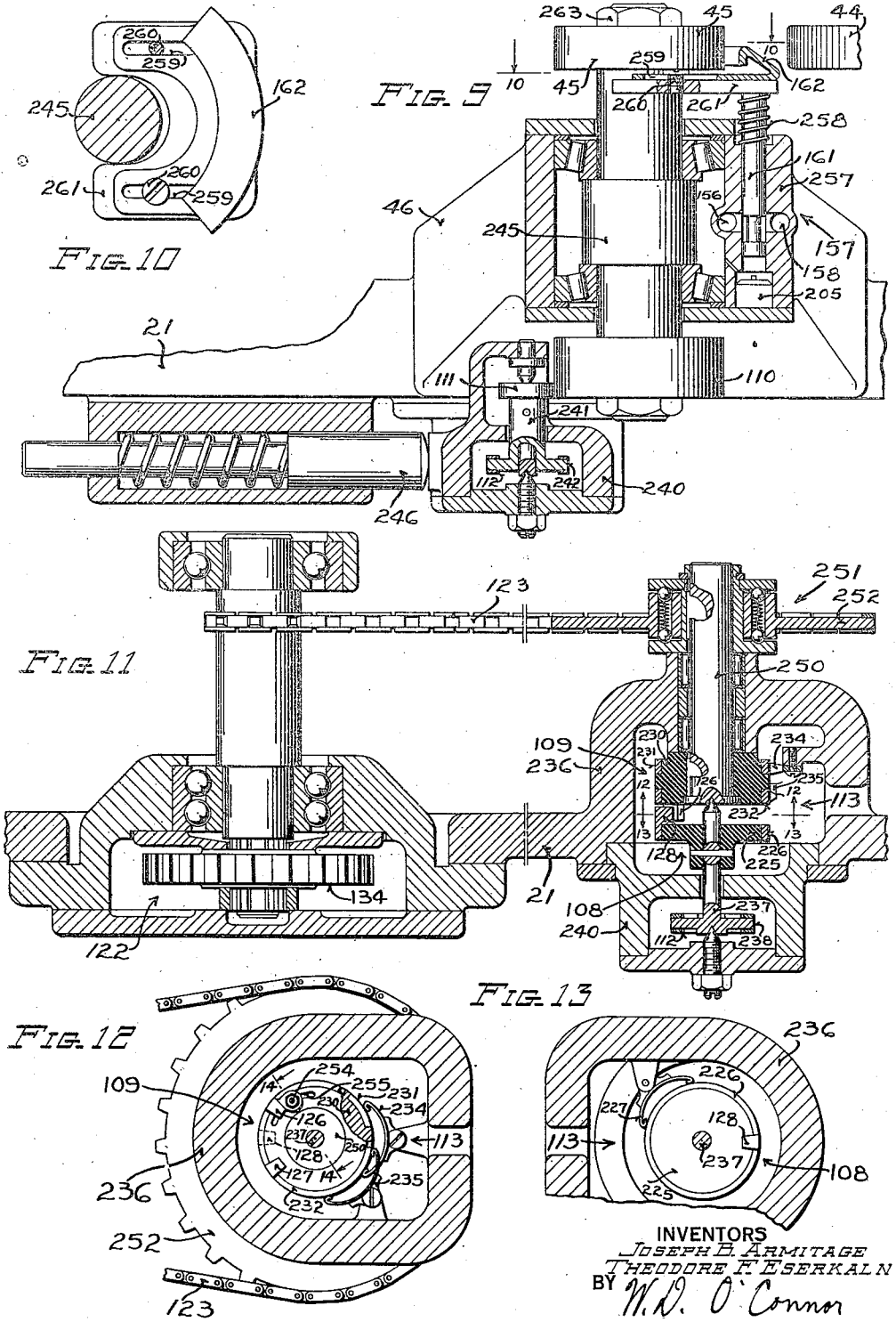

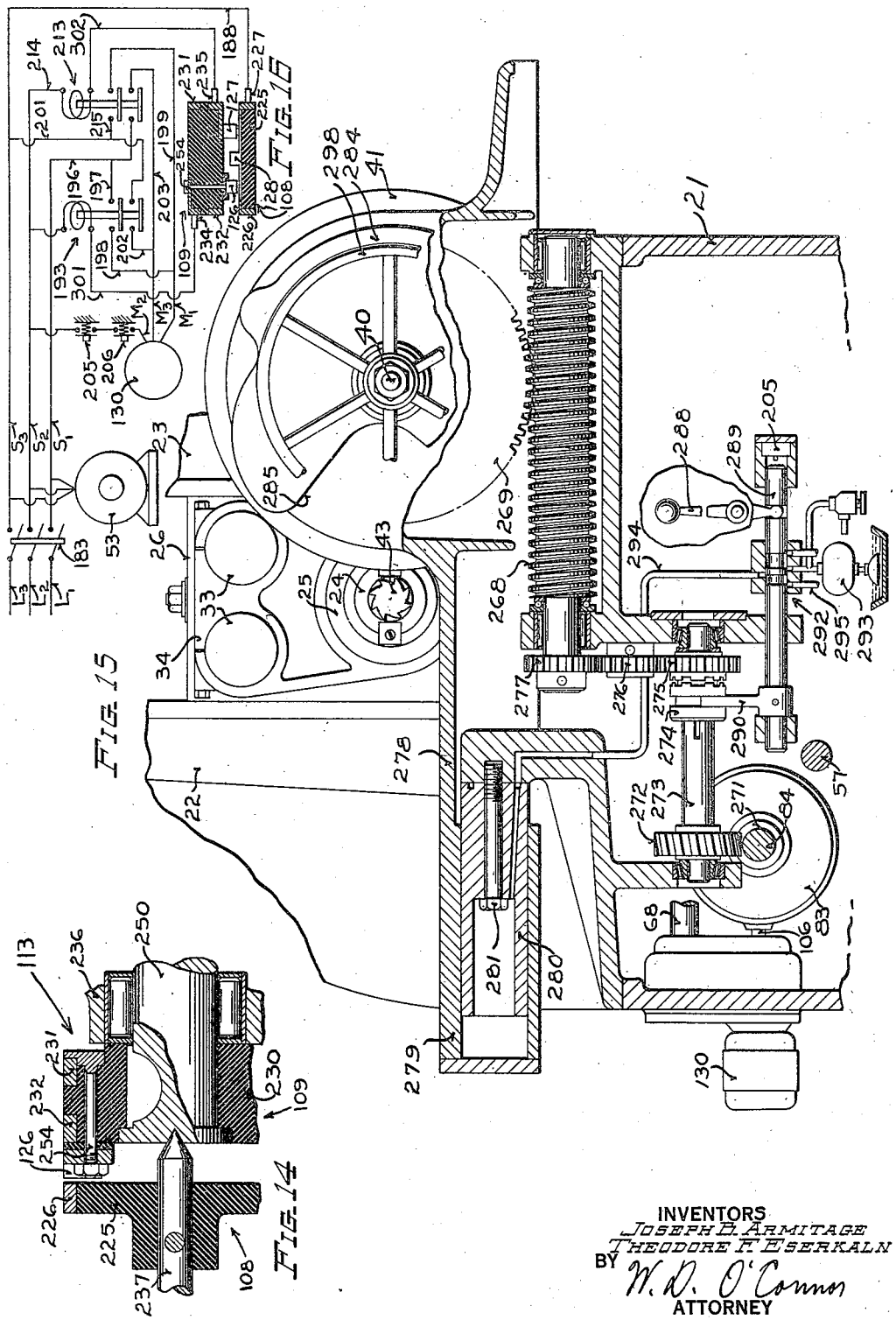

2,415,801

UNITED STATES PATENT OFFICE 2,415,801

PATTERN CONTROLLED MACHINE TOOL

Joseph B. Armitage and Theodore F. Eserkaln, Wauwatosa, Wis., assignors to Kearney & Trecker Corporation, West Allis, Wis., a corporation of Wisconsin Application January 6, 1939, Serial No. 249,554

48 Claims. (Cl. 90—13.4)

This invention relates, generally, to improvements in machine tools and more particularly to improved actuating and controlling mechanism especially adapted for effecting and regulating the operation of pattern controlled machine tools.

In operating pattern controlled machine tools it has been the usual practice to effect relative feeding movements between a workpiece and a forming tool along two angularly disposed paths simultaneously, the movement along one path being continuous and occurring at a substantially constant rate, and the movement along the other path being pattern controlled and occurring in either direction and at rates varying in accordance with the contour of the pattern being followed. This mode of operation is disadvantageous in that it results in a non-uniform cutting action, since the actual rate of relative feeding movement between the tool and the workpiece varies with each change in the cutting direction in following the contour of the pattern. Under these conditions, the rate of operation of the machine is limited to that at which the desired degree of finish is produced on the workpiece at the point where the cutting action is most rapid. Consequently, the forming tool is constrained to operate at low efficiency much of the time and the surface produced by it presents varying degrees of finish corresponding to the variations in the rate of relative feeding movement.

A general object of this invention is to provide more efficient actuating and controlling apparatus for a machine tool.

Another object of the invention is to provide an improved pattern controlled machine tool adapted to function at maximum efficiency in machining a surface of irregular contour on a workpiece.

Another object is to provide an improved pattern controlled machine tool functioning automatically to form a finish of uniform predetermined character upon the surface of an irregularly shaped workpiece.

Another object is to provide an improved pattern controlled machine tool adapted to maintain automatically a substantially constant rate of machining action regardless of the shape of the contour being machined.

Another object is to provide an improved pattern controlled machine tool arranged to function automatically in such manner that the rate of relative feeding movement between the forming tool and the workpiece is maintained substantially constant regardless of changes in the direction of the cutting action.

Another object is to provide a pattern controlled machine tool in which the rate of relative feeding movement between the forming cutter and the workpiece is maintained substantially constant at the point of contact between the cutter and the workpiece.

Another object is to provide an improved pattern controlled forming mechanism in which the rate of relative feeding movement between the workpiece and the forming tool is governed in accordance with changes in the speed of the guiding surface of the pattern at the point effecting the guiding action.

A more specific object of the invention is to provide a pattern controlled machine tool in which the pattern is engaged by a follower roller and the rate of feeding movement between the cutter and the workpiece is regulated in response to changes in the speed of rotation of the follower roller in moving over the pattern.

Another object is to provide an improved pattern controlled machine tool having control mechanism which responds to changes in the peripheral speed of a follower roller in moving over a pattern to maintain substantially constant the rate of relative feeding movement between the workpiece and the cutter at the point of contact of the cutter with the workpiece.

Another object is to provide an improved control system for a pattern controlled machine tool.

Another object is to provide an improved electrical control system for regulating the rate of feeding movement in a machine tool.

Another object is to provide improved driving means for rotating a pattern and a workpiece in a pattern controlled machine tool.

Another object is to provide a pattern controlled machine tool capable of following a pattern presenting steep contour elements.

Another object is to provide an improved machine tool driving apparatus including a differential mechanism arranged to effect turning movement of a machine element and to exert a retractive force in the event that turning movement of the element is abnormally resisted.

Another object is to provide improved control means for preventing the engagement of a pattern and follower at excessive speed.

Another object is to provide a pattern controlled machine tool having governing means for regulating the rate of feeding movement together with control apparatus adapted to effect reversal in the direction of the feeding movement and operating simultaneously to reverse the action of the rate controlling apparatus.

Another purpose of the invention is to provide improved transmission and control mechanism, such that the rate of one transmission line may be maintained in exact synchronism with the rate of another line as, for example, to maintain a constant rate in spite of tendency in the second transmission to vary its rate, or to duplicate rate variations in the second transmission in accordance with rate variations in the first transmission.

Another purpose of the invention is to provide an improved cutting feed mechanism, in which any of various rates of relative tool and work movement may be pre-selected and maintained constant in spite of conditions normally tending to vary the feed rate in different portions of the cutting movements as, for example, in pattern controlled movements, where the actual feed rate normally varies according to changes of form in the contour which is being machined.

Another purpose is to provide an improved transmission and control for the relative movements of a pattern and follower or tracer, and for the movable supports controlled thereby, in which the tracer will operate to accurately follow or trace steep contours on the pattern and to copy such contours on a workpiece, including surfaces which are perpendicular to the general plane of the traced configuration.

A further purpose is to effect an improved transmission and control mechanism for pattern controlled operations, in which the pattern and tracer are maintained in substantially constant pressure contact during cutting operations, yet are capable of tracing and copying relatively steep angles.

A further purpose is to provide an improved machine, and transmission and control mechanism therefor, for effecting so-called continuous machining operations upon a series of workpieces by the means of pattern controlled movements, and particularly for continuous rotary milling operations.

A further purpose is to provide improved transmission and control means for a reciprocable machine tool support in which rate reducing or cushioning means is provided at least at one end of the movement.

A further purpose is to provide improved transmission and control means for relative movement of tracer and pattern members between loading and cutting positions, in which the major portion of the movement may be at a relatively rapid rate but the return to cutting position is effected with automatic change to slow movement at a point controlled in accordance with the contour of the pattern.

A further purpose is to effect an improved transmission and control mechanism including preferred and improved interlocks or interconnections of control mechanism between a plurality of transmission or control portions, particularly for copying machines.

A still further purpose is generally to simplify and improve the construction and operation of transmission and control means for machine tools, particularly for machines incorporating some of the previously mentioned improvements, and especially for milling machines, and still other objects will be apparent from the following description taken in connection with the claims.

According to this invention, an improved pattern controlled machine tool for forming contoured surfaces is provided with control means functioning automatically to maintain the rate of relative feeding movement between a forming tool and a workpiece substantially constant regardless of the shape of the pattern being followed. To this end, the relationship between the guiding pattern and its cooperating follower is maintained equivalent to that between the workpiece and the forming tool, with the result that the speed of the guiding surface of the pattern relative to the follower at the point engaged by the follower is comparable to the speed of the workpiece surface relative to the forming tool at the point engaged by the forming tool. Consequently, the rate of actual relative feeding movement between the workpiece and the forming tool may be governed in response to variations in the speed of the guiding surface of the pattern at the point of engagement with the follower. In a preferred embodiment utilizing a rotary forming tool, the pattern is formed in the exact shape and size of the contour which it is desired to reproduce on the workpiece, and it is engaged by a follower roller of diameter exactly equal to that of the rotary tool. Since the speed of the guiding surface at the point engaged by the follower roller is then exactly the same as the speed of the corresponding point on the workpiece that is engaged by the rotary tool, and since the surface speed of the follower roller is equal to the surface speed of the pattern at the point of contact, the speed controlling mechanism may be made directly responsive to the peripheral speed of the follower roller, the arrangement being such that when the rate of movement of the roller tends to increase, the control mechanism acts to reduce the speed of the driving mechanism effecting the relative feeding movement, or vice versa. By this arrangement, the movement of the pattern and the workpiece is controlled automatically in such manner that the relative feeding rate between the forming tool and the workpiece at the point of contact therebetween is maintained substantially constant to provide a uniform predetermined cutting action regardless of changes in the contour of the surface being formed. The speed control mechanism may be electrically actuated and may be adjusted to provide any desired degree of sensitiveness. Guiding patterns of various shapes and sizes and follower rollers of various diameters may be utilized, and since the control mechanism is responsive to the peripheral speed of the guiding roller, it is adaptable to any combination. Under special circumstances it may be found desirable to utilize a guiding pattern differing in shape and size from the workpiece, and to adapt the follower mechanism to compensate for the difference. According to a modified construction, the workpiece and pattern are arranged to be rotated by means of a differential mechanism, the arrangement being such that upon the follower engaging a steep portion of the pattern surface the differential mechanism will tend to retract the pattern radially in opposition to the constant force tending to advance the pattern into engagement with the follower. Improved control means are provided for effecting manual control of the movement of the pattern and workpiece toward or away from the follower and cutter and for effecting reversal in the direction of feeding movement of the workpiece relative to the cutter.

The forming tool may be a milling cutter or a grinding wheel or the like, and the machine may be so arranged that a preliminary milling operation on a workpiece may be followed by a finishing grinding operation.

The foregoing and other objects of this invention, which will become more fully apparent from the following detailed specification, may be achieved by the particular pattern controlled milling machines constituting exemplifying embodiments of the invention that are illustrated in and described in connection with the accompanying drawings, in which:

Figure 1 is a view in right side elevation of a pattern controlled milling machine constituting apparatus incorporating the invention in a preferred practical form, part of the machine frame having been broken away to show some of the internal driving mechanism;

Fig. 2 is a view in front elevation of the milling machine shown in Fig. 1 with parts broken away to show some of the controlling mechanism;

Fig. 3 is a fragmentary view showing a workholding fixture and a cooperating cutting tool constituting the working elements of the machine, taken partly in rear elevation and partly in vertical section along the line 3—3 in Fig. 1;

Fig. 4 is another view in front elevation generally similar to Fig. 2 but taken partly in vertical section substantially along the line 4—4 in Fig. 1;

Fig. 5 is an expanded, partly diagrammatic plan view showing a mechanical transmission mechanism for actuating the various movable elements of the machine, and part of the control mechanism;

Fig. 6 is fragmentary diagrammatic view similar to part of Fig. 5 but showing a modified work forming mechanism adapted to effect a grinding operation;

Fig. 7 is a schematic circuit diagram of an electrical control system forming part of the control mechanism of the machine;

Fig. 8 is a diagrammatic view of a hydraulic control circuit and some of the apparatus associated with it for hydraulically controlling the actuation of various parts of the machine;

Fig. 9 is an enlarged detailed view of part of the feed rate controlling mechanism taken generally in horizontal section substantially along the line 9—9 in Fig. 2;

Fig. 10 is an enlarged detailed view of a control shoe taken partly in rear elevation and partly in vertical section substantially along the line 10—10 in Fig. 9;

Fig. 11 is an enlarged view in horizontal section of another part of the feed rate controlling mechanism taken generally along the line 11—11 in Fig. 2;

Fig. 12 is an enlarged detailed view of an electrical control unit taken in vertical section along the line 12—12 in Fig. 11;

Fig. 13 is a similar sectional view of the control unit, complementary to Fig. 12 and taken on the same vertical plane but looking in the opposite direction as indicated by the arrows 13—13 in Fig. 11;

Fig. 14 is another enlarged fragmentary view of the electrical control unit taken in longitudinal section generally along the line 14—14 in Fig. 12;

Fig. 15 is a view partly in front elevation and partly in vertical section generally similar to Fig. 4, but showing a machine of somewhat different construction embodying modifications of the invention, non-essential parts of the machine having been broken away to better disclose the operating mechanism; and, Fig. 16 is a schematic circuit diagram of a simplified electrical control system associated with the modified machine shown in Fig. 15.

The particular pattern controlled machine tools illustrated in the drawings as exemplifying apparatus of the class adapted to be constructed and operated in accordance with the principles of the present invention, are primarily milling machines of the bed type, although it is to be understood that the invention may be applied to other machine tools of different construction with equal advantage.

Referring more specifically to the drawings, and particularly to Figs. 1 and 2 thereof, the milling machine there shown incorporates a practical, operative embodiment of the improved pattern controlled contour forming mechanism to which this invention is directed, the entire apparatus being fully described herein by way of a complete disclosure. As there shown, the structure comprises essentially a hollow bed or base 21 that constitutes the foundation or frame of the milling machine forming a housing for the driving mechanism for actuating the various movable parts of the apparatus, and that serves also as a support for a pair of spaced uprights 22 and 23 rigidly mounted at the rear thereof and constituting an upstanding column structure for supporting a bodily movable horizontal tool carrying spindle 24.

To provide for horizontal and vertical adjustment of a cutting tool in a vertical plane, the tool carrying spindle 24 is rotatably mounted in an axially slidable quill 25 which is carried by and arranged for endwise adjustment within a spindle block or carrier 26, the carrier in turn being slidably mounted for vertical adjustment between the uprights 22 and 23 of the column structure. Vertical adjustment of the spindle 24 may be effected by means of a crank (not shown) applied to a squared end 27 (Fig. 1) of a shaft protruding from the right-side of the base 21 and operatively connected to actuate a screw and nut mechanism or the like functioning in well known manner to move the block 26 vertically within the column. Horizontal axial adjustment of the spindle 24 may be effected by applying the crank to the squared end of a shaft 28 protruding from the right-side of the column and operatively connected as shown in Fig. 5 to actuate, through bevel gears 29, a worm 30 that meshes with complementary rack teeth 31 formed in the quill 25. After an adjustment has been effected, both the spindle block and the quill may be clamped in adjusted position by tightening clamping bolts 32 on the side of the column in well known manner.

The spindle block or carrier 26 also supports the usual overarm structure comprising in this instance a plurality of spaced overarms 33 each slidably mounted in the upper part of the block parallel with the spindle 24 and carrying conjointly a depending quill supporting yoke or pendant 34 that serves to support the overhanging end of the quill rigidly, clamping means being provided for securing the arms in the adjusted position.

On the upper surface of the bed 21 in front of the column structure, is slidably mounted a reciprocating work supporting table or platen 38 guided for movement in a path transverse to the axis of the tool spindle 24. The table 38 rotatably supports a work and pattern carrying spindle 40 which is journalled thereon axially parallel with the tool spindle 24 and carries at its inner end adjacent to the spindle 24 a rotatable work holder or supporting fixture 41 that is adapted to present a plurality of workpieces 42 successively in accurately spaced cooperating relationship with a suitable rotary cutter 43 carried by the tool spindle, as best shown in Fig. 3. At its forward or outer end, the work spindle 40 carries a guiding cam or pattern 44 having its outer edge or periphery contoured in predetermined manner to present a controlling surface that constitutes a guide for successively machining the plurality of workpieces on the fixture 41 to the desired shape.

For cooperating with the rotary guiding template or pattern 44, there is provided a tracer element in the form of a follower roller 45 which is journalled in a bracket 46 rigidly mounted on the base 21 in position to be engaged by the periphery of the pattern 44 as shown in Fig. 2. The pattern 44 is normally held in contact with the follower roller 45 under a constant yielding pressure by means of a hydraulic piston 48 operating in a cylinder 49 fixed on the frame 21 as shown in Fig. 4, the arrangement being such that during a machining operation the piston 48 urges or biases the table 38 to the left as seen in Figs. 2 and 4 thereby holding the pattern against the follower roller and urging the workpieces 42 into cutting engagement with the rotary cutter 43 in such manner that upon rotation of the spindle 40 the table 38 will move to right or left as may be necessary in effecting reproduction of the contour of the guiding pattern upon the workpieces.

In order to insure accurate reproduction of the pattern contour, it is necessary that the cutter 43 be of such diameter that its radius is somewhat less than the radius of the most sharply curved concave surface element to be formed on the workpiece. In the preferred construction illustrated in the drawings, the pattern is provided with an external guiding surface of the exact size and shape of the contour required to be formed by the cutter on the workpiece, and the follower roller 45 is of diameter exactly equal to that of the cutter 43. Further, the follower roller is mounted in the vertical plane of the cutter spindle 24 and the spindle is adjusted vertically to bring the cutter into exact axial alignment with the roller as shown in Fig. 2, the arrangement being such that the relationship between the cutter and the workpiece is the exact duplicate of the relationship between the follower and the pattern.

Although satisfaction of the requirements as to the size and position of the pattern and cooperating follower roller relative to the workpiece and cutter will result in accurate reproduction of the desired contour, it does not necessarily result in the most effective operation of the machine. In pattern controlled machines as previously constructed, the cutting action of the cutter upon the workpieces varies considerably with changes in the slope or angle of the contour of the pattern, the actual feeding rate being comparatively slow at some points and very much faster at others depending particularly upon the amount of movement effected by steep elements of the pattern. Accordingly, the speed of operation of prior machines is necessarily so limited that the maximum feeding rate at the steepest element of the pattern does not exceed that at which the desired degree of finish is attained, with the result that on other elements of the work the feeding rate is much lower than it should be, the final effect being that the productive capacity of the machine is seriously restricted.

In accordance with an important feature of this invention, this limitation upon efficient operation is obviated by controlling the rate of relative feeding movement in manner to maintain it substantially constant, the speed of rotation of the pattern and work carrying spindle 40 being varied automatically in such manner that the actual rate of relative feeding movement between the cutter and the surface of the workpiece is maintained substantially constant regardless of the shape of the contour of the pattern being followed. Since the follower roller 45 is equal in diameter to and disposed co-axially with the cutter 43, it engages the guiding surface of the pattern 44 in exactly the same manner and at the same angular position that the cutter engages the workpiece. Therefore the rate of movement of the point on the guiding surface of the pattern which engages the follower roller, relative to the roller, is exactly equal to the rate of movement of the point on the workpiece which is engaged by the cutter 43, relative to the cutter, regardless of angular changes in the position of the contact point. Consequently, to maintain a uniform rate of feeding movement or cutting action, the rate of movement or surface speed of the point on the pattern which engages the follower roller may be utilized as the controlling factor and as this rate of movement is transmitted directly to the follower roller, the desired cutting rate may be effected by maintaining the speed of the follower roller 45 substantially constant.

To this end, there is provided according to this invention, a governing mechanism denoted generally by the reference numeral 50 which is actuated by the follower roller 45 and functions to vary the rate of rotation of the work carrying spindle 40 automatically in such manner that the rate of movement of the guiding surface of the pattern 44 at its point of contact with the follower roller is maintained substantially constant, thereby insuring a substantially uniform rate of cutting action between the cutter 43 and the workpiece.

The mechanism for driving the tool spindle 24 and for turning the work supporting spindle 40 includes a driving motor 53 mounted within the hollow base 21 as shown in Fig. 4, and having on its shaft a pulley 54 connected by belts 55 with a main driving pulley 56, as shown in Figs. 1 and 5. The driving pulley 56 is selectively connectable to a main driving shaft 57 by means of a friction main clutch 58 that may be actuated by a hand clutch lever 59 disposed at the front of the machine base (Figs. 1 and 2) and functioning through suitable connecting mechanism to start or stop the operation of the machine by engaging or disengaging the clutch.

Power for driving the tool spindle 24 is taken from the shaft 57, as shown in Fig. 5, by means of a spur gear 61 meshing with a similar spur gear 62 that carries a bevel gear 63 which meshes in turn with a cooperating bevel gear 64. The bevel gear 64 is mounted on a shaft 65 that extends to a speed changing mechanism at the left side of the machine comprising in this instance a pick-off gear 66 on the shaft 65 and a meshing complementary pick-off gear 67 on the end of a parallel horizontal shaft 68, the pick-off gears being interchangeable and reversible in well known manner to provide for driving the spindle at a selected constant speed. The shaft 68 extends inwardly to a point beneath the spindle block 26 as shown in Fig. 5 and is provided at its inner end with a bevel gear 69 that meshes with a complementary bevel gear 70 journalled in the bed 21. The gear 70 has splined engagement with a vertically disposed splined shaft 73 which extends upwardly into and is rotatably supported by the head 26, the splined connection permitting vertical adjustment of the head without interfering with the driving connection. At its upper end within the head 26, the shaft 73 is provided with a bevel gear 74 that meshes with a bevel gear 75 on the end of a horizontally disposed splined shaft 76. The shaft 76 is disposed parallel with the spindle 24 and has slidably mounted thereon a spur pinion 77 that meshes with a spur gear wheel 78 on the inner end of the spindle, the arrangement being such that when the quill 25 and the spindle are adjusted axially, the pinion 77 will slide along the splined shaft 76 to maintain the driving connection.

Power for driving the work and pattern supporting spindle 40 is likewise taken from the main driving shaft 57 through the spur gears 61 and 62, the gear 62 being fixed on an in-put shaft 82 at one end of a variable speed transmission unit or rate changer 83 which has at its other end an output shaft 84. The out-put shaft 84 of the transmission unit is provided with a worm 85 that meshes with and drives a worm wheel 86 fixed on a horizontal shaft 87, as shown in Figs. 1, 4 and 5. The shaft 87 carries a spur gear 88 that meshes with a slidably mounted clutch gear 89 having clutch teeth which may be engaged selectively with complementary teeth of either a clutch gear 90 or a clutch gear 91 to constitute a reversing mechanism for the work spindle drive. As shown, the gear 90 meshes directly with a gear 92 on a driving sleeve 93 in manner to rotate it in one direction, while the gear 91 meshes with an idler gear 94 that in turn meshes with a gear 95 on the sleeve 93 for rotating it in the opposite direction.

The sleeve 93 is provided with an internal spline which slidably engages a splined shaft 97 in manner to provide a driving connection and at the same time to permit endwise movement of the shaft relative to the sleeve. As best shown in Fig. 4, the shaft 91 is journalled in the table 38 for movement with it and carries a worm 98 that meshes with a cooperating worm wheel 99 on the work and pattern supporting spindle 40, the arrangement being such that the spindle 40 may be driven in either direction at the rate determined by the transmission unit 83.

Thrust bearings 101 and 102 are arranged on the shaft 97 in manner to resist axial forces in retaining the shaft and the worm 98 in fixed axial position relative to the movable table and, as a matter of convenience, the table actuating piston 48 may be connected directly to the shaft 97. As shown in Fig. 5, the piston 48 is provided with a piston rod 104, the rod 104 being connected by a rotatable joint or thrust coupling 105 to the end of the shaft 97 in such manner that pressure exerted upon the piston 48 in either direction causes the piston rod 104 to move the shaft 97 and consequently the table 38 in the corresponding direction.

The transmission unit or rate changer 83 is preferably of the infinitely variable type capable of effecting stepless changes in speed throughout a considerable range of action, adjustment thereof being accomplished by rotation of a speed controlling shaft 106. The operation of the unit may be in accordance with any of several well known systems, its mechanism being either mechanical, hydraulic, or electrical in character, the particular construction being of no consequence in this instance.

When the machine is in operation, pressure is applied to the piston 48 in the direction to force the table 38 to the left thereby engaging the pattern 44 with the follower roller 45, as appears in Figs. 2 and 5. As previously explained, the follower roller 45 is equal in diameter to, and is disposed in axial alignment with the cutter 43, the arrangement being such that the follower roller engages the pattern 44 in a position corresponding exactly to that in which the rotating cutter engages the workpiece 42, with the result that the cutter forms on the workpiece a contour exactly duplicating the guiding surface of the pattern. Since the rate of the relative feeding movement between the workpiece and the cutter at the point of cutting contact is exactly equal to the rate of movement of the guiding surface of the pattern 44 at the point engaged by the follower roller 45, as previously explained, a uniform rate of relative feeding movement between the workpiece 42 and the cutter 43, may be maintained by controlling the rate of rotation of the work holding spindle 40 in response to changes in the speed of the pattern guiding surface at the point of contact with the follower. Furthermore, since the peripheral speed of the roller equals that of the guiding surface at the contact point, and since rollers of different diameters are utilized to correspond with cutters of different sizes, the controlling speed for actuating the governing mechanism 50 may conveniently be taken from a point on the periphery of the roller or from an auxiliary roller driven by the roller 45.

In the particular construction shown, the governing mechanism 50 is so arranged that it is more convenient to take the controlling speed from the surface of a second or auxiliary roller 110 of diameter corresponding to that of the roller 45 and operatively connected thereto but disposed farther forward on the machine, instead of directly from the follower roller. Accordingly, the roller 110 is frictionally engaged by a governing or measuring roller 111 of predetermined, fixed diameter, which is operatively connected by means of a chain 112 to drive one rotatable control element 108 of an electrical rate control unit 113 at speeds varying in accordance with changes in the speed of the pattern surface at the contact point. To provide a standard rate or synchronizing action serving as a basis for establishing the predetermined uniform feed rate, another co-axially disposed rotatable element 109 of the control unit 113 is driven continuously at a selectively predetermined standard speed from the main driving shaft 57, as shown in Fig. 5. For this purpose, a bevel gear 114 is provided on the forward end of the shaft 57 in position to have meshing engagement with complementary bevel clutch gears 115 and 116 and constituting therewith a reversing mechanism by means of which the direction of rotation of the element 109 may be selected. A clutch collar 117 disposed between the gears 115 and 116 functions to couple one or the other of these gears to a shaft 118 carrying a worm 119 that meshes with a worm wheel 120 on a shaft 121. The shaft 121 extends to the front of the machine, as appears in Figs. 1 and 2, and drives a rate changing pick-off gear mechanism 122 which is operatively connected by a chain 123 to drive the standard speed element 109 of the control device 113 at a selected constant speed in the desired direction.

The standard speed element 109 of the rate control unit 113 is provided with two arcuately spaced electrical contact elements 126 and 127 arranged to be engaged alternatively by an intermediate contact element 128 carried by the element 108 of the control unit, which is driven at the variable speed corresponding to that of the pattern contact point. Whenever the speed of the guiding surface of the pattern 44 at its point of engagement with the follower roller 45 varies from the predetermined relative cutting rate, the roller 45 and the governing roller 111 vary in speed correspondingly, in manner to cause the variable speed element 108 carrying the contact 128 to speed up or slow down thereby bringing the contact 128 into engagement with one or the other of the contacts 126 and 127 on the standard speed element 109. This establishes an electrical circuit to control a regulating motor 130 connected to turn the control shaft 106 of the variable speed transmission mechanism 83, the motor functioning to so adjust the mechanism that the speed of rotation of the work and pattern carrying spindle 40 is either increased or decreased sufficiently to reestablish and maintain constant the predetermined rate of relative feeding movement between the workpiece 42 and the cutter 43. This regulation of the feeding rate results in a uniform cutting action between the cutter 43 and the workpiece which may be established, by adjusting the rate changer 122, at such rate that the cutter operates most efficiently at all times and coincidentally effects a finished surface of predetermined uniform character on all parts of the workpiece.

Since the cutting or feeding rate is controlled by the rate of rotation of the measuring roller 111, and since the rate of rotation of the measuring roller is directly responsive to the linear velocity of the guiding surface at the point of contact with the follower, the controlling action is not dependent upon the diameter of a particular follower roller nor upon the shape of the pattern. Accordingly, the established feed rate remains constant at its predetermined value regardless of the fact that follower rollers of different diameters may be utilized to correspond with various cutters or that the pattern may be changed for one of a different contour. By reason of this arrangement, the actual feed rate may be predetermined accurately in the usual manner merely by inserting appropriate pick-off gears 131, 132, 133 and 134 in the speed changing gear mechanism 122, in accordance with the indications of a feed rate chart or other well known means. Consequently, the desired feed rate may be established in advance at that best suited to the conditions of the work, in order to obtain the maximum rate of machining action consistent with the desired degree of finish, regardless of the shape or size of the pattern or the diameter of the cutting tool and follower roller, the action being equally efficient on patterns presenting external or internal guiding surfaces. Although the particular pattern shown presents an external or peripheral guiding surface, it is to be understood that patterns having internal guiding surfaces may be utilized by so adapting the machine that the work holding spindle 40 may be moved to a position at the left of the tool spindle 24. The follower roller 45 may then be arranged to engage the inner guiding surface of the pattern at the right side of the pattern supporting spindle 40 and the directions of rotation of the cutter and work holder adjusted to effect the desired cutting action.

The hydraulic pressure for acting upon the piston 48 to retain the pattern 44 in contact with the follower roller 45 as previously described, is derived from a pump 140 shown in Fig. 1 and represented diagrammatically in Fig. 8. As indicated in the circuit diagram, Fig. 8, the pump 140 forces liquid under pressure through a conduit 141 and a branch conduit 142 to a port 143 in a valve casing 144 that communicates with a port 145 through which the pressure liquid flows into a conduit 146 leading to the right end of the cylinder 49, thereby exerting pressure to the left upon the piston 48 and urging the table 38 to the left to engage the pattern with the follower roller as previously explained.

In order to retract the pattern and workpiece from engagement with the follower roller and the cutter respectively, as may be required to permit changing the workpiece or for substituting a different pattern, a control lever 148 mounted on the front of the machine as shown in Fig. 2, may be moved to the right, thereby moving a valve plunger 149, to which it is operatively connected, to the right within the valve casing 144, as seen in Fig. 8. This results in the plunger disconnecting the port 143 from the port 145 leading to the right end of the cylinder 49 and establishing a connection between the port 143 and a port 151 that communicates with a conduit 152 leading to the left end of the cylinder. Pressure exerted through the conduit 152 upon the left face of the piston 48 thereupon causes the work-carrying table 38 to move rapidly to the right, the liquid in the right end of the cylinder 49 escaping through the conduit 146 and the port 145 which is then open to atmosphere through the left end of the valve casing 144.

As the piston 48 approaches the limit of its movement to the right, it closes off successively a plurality of ports 153 in the right end of the cylinder 49, leading into the conduit 146, in such manner that the rate of escape of liquid from the right end of the cylinder is progressively reduced until only the liquid which may pass through a restricted orifice 154 in the end of the cylinder is permitted to escape. This constitutes a buffing action which prevents shock and damage to the mechanism, the arrangement being such that the rate of travel of the table is reduced gradually to a predetermined low rate as it approaches the limit of the retracting movement, any excessive pressure which may develop in the hydraulic system being relieved through an adjustable relief valve 155, preferably into the lubricating system of the machine.

After the required adjustments to the pattern and workpiece have been effected, the table 38 may be advanced to the left into the zone of cutting action to reengage the workpiece with the cutter 43, by moving the control lever 148 to the left to the position shown in Figs. 2 and 8. This reestablishes the flow of pressure liquid through the ports 143 and 145 and the conduit 146 into the right end of the cylinder 49 in manner to move the piston 48 and the table 38 to the left at a rapid or quick transverse rate. The liquid in the left end of the cylinder then escapes by way of the conduit 152 and a conduit 156 through an exhaust valve 157 and a conduit 158 to a port 159 in the valve casing 144, which is then open to atmosphere through the right end of the valve casing.

Since the cutter or the workpieces might be damaged if they were brought together at the rapid rate of movement of the table, means are provided for controlling the escape of exhaust liquid to reduce the rate of movement to a predetermined feed rate just prior to the engagement, thereby avoiding shock. For this purpose, the exhaust valve 157 is provided with a spring urged plunger 161 carrying on its outer end a shoe 162 presenting an angular face that is disposed to be engaged by one edge of the pattern 44 and moved aside and inwardly as shown in Figs. 8 and 9, as the pattern 44 moves into engagement with the follower roller 45. As shown, the valve plunger 161 thereupon closes the passageway through the exhaust valve 157 and prevents further escape of liquid through the conduit 158 and the open port 159. The liquid remaining in the cylinder 49 is then restricted to escape through the conduit 152 and the port 151 which is then in communication with a port 163 connected with a conduit 164 leading to an adjustable feed rate throttle valve 165. The throttle valve 165 permits the escape of exhaust liquid at a restricted rate to limit further movement of the workpiece toward the cutter to a predetermined relatively slow feed rate. After the workpiece is brought into contact with the cutter, a steady force is exerted upon the piston 48 by the full pressure of the liquid, the pressure being determined by the setting of the adjustable relief valve 155.

When relatively large workpieces are being machined, it is ordinarily necessary to retract the table 38 each time that the workpiece is changed, however, when the apparatus is arranged to machine relatively small workpieces such as the workpieces 42 shown in Fig. 3, each successive piece may be removed after being machined and a new piece substituted without retracting the work table 41 and while it continues to rotate with another workpiece in engagement with the cutter, the arrangement being such as to effect a continuous machining operation.

When it is desired to reverse the direction of rotation of the work supporting spindle 40 in order to effect the cutting action in the opposite direction, the reverse clutch gear 89 in the driving mechanism may be shifted by means of a reverse lever 168 mounted on the front of the machine, as shown in Fig. 2. As appears in Fig. 8, the lever 168 is connected to actuate a sliding control rod 169 which moves a shifting fork 170 slidably mounted on a guide rod 171 and engaging opposite sides of the clutch gear 89. To disconnect the driving mechanism from the spindle 40, the lever 168 may be moved to the vertical position shown in Figs. 2 and 8, the clutch gear 89 then being in neutral position between the clutch gears 90 and 91 and disengaged from both of them as shown. When the lever is moved in either direction to either of the operating positions indicated by the dotted circles in Fig. 8, the clutch gear 89 is moved into engagement with either the clutch gear 90 or the clutch gear 91 to effect turning movement of the spindle 40 in the one or the other direction.

When the direction of rotation of the spindle 40 is changed, the variable speed element 108 of the electrical control unit 113 is driven in the opposite direction by the governing roller 111 and the connecting chain 112. Consequently, in order to obtain the required synchronizing action, the direction of rotation of the standard speed element 109 must be reversed also. This is effected simultaneously with reversal of the spindle 40 by hydraulically actuated means for shifting the clutch sleeve 117 of the bevel gear reversing mechanism. As appears in Fig. 8, the reversing control rod 169 is provided at one end with a valve plunger 173 which operates in a valve casing 174 and functions to connect the pressure conduit 141 alternatively to a conduit 175 or a conduit 176 which lead to cylinders 177 and 178, respectively. The cylinders 177 and 178 engage opposite ends of a piston element 179 carrying a shifting fork 180 that engages the clutch collar 117, the arrangement being such that the collar 117 is shifted hydraulically in synchronism with the clutch gear 89 to reverse the standard speed element of the control unit 113 at the same time that the variable speed element is reversed. By reason of the hydraulic interconnection between the reversers, manual engagement of clutch gear 89 with either of its cooperating clutch gears is not interfered with in the event that the ends of the clutch teeth on the clutch collar 117 abut with the ends of cooperating clutch teeth on the gear 115 or the gear 116. In such case the clutch gear 89 is free to move into full engagement with its cooperating clutch gear and the hydraulic pressure exerts a continuous force upon the collar 117 for moving it into engaged position as soon as its teeth are turned to mesh with the cooperating clutch teeth.

When the direction of rotation of the variable speed element 108 of the control unit 113 is reversed in consequence of reversing the direction of rotation of the spindle 40, the action of the two contact elements 126 and 127 of the standard speed element 109 is likewise reversed, since the opposite one of these contacts will then be engaged by the intermediate contact 128 whenever excessive speed is transmitted from the pattern to the variable speed element 108, and vice versa. Accordingly, the electrical connections from the contacts 126 and 127 to the regulating motor 130 must be correspondingly reversed by action of the reversing lever 168. For this purpose there is provided a pair of circuit reversing switches 181 and 182 which are associated with and actuated by the reversing lever 168, the arrangement being such that both switches are in the open position when the lever is in neutral, as is shown in the wiring diagram, Fig. 7.

Electrical energy for energizing the main motor 53 and the speed controlling motor 130 is derived from line conductors L1, L2 and L3 through a main starting switch 183, as shown in Fig. 7. Assuming now that the work spindle reversing lever 168 is moved to the right thereby closing the circuit reversing switch 182 for conditioning the control system to operate in predetermined direction, a circuit is established from the line conductor L1 through the motor starting switch 183, a supply conductor S1, a conductor 184, the closed switch 182, a conductor 185, the solenoid of a relay 186, and thence through a conductor 187, to a supply conductor S2, the switch 183 and the line conductor L2, thereby closing the relay 186. This establishes connections with the contacts 126 and 127 of the standard speed element 109 for controlling the speed regulating motor 130 during operation of the spindle 40 in the direction corresponding to the position of the lever 168. Either one of the contacts 126 or 127 may now be energized for controlling the motor 130, by contact with the variable speed contact 128, which is connected by a conductor 188 and a supply conductor S3 to the switch 183 and the third line conductor L3. When the variable speed contact 128 is moved into engagement with one of the standard speed contacts, the contact 126, for example, a circuit is completed from supply conductor S3 through conductor 188, and the contact 128, to the contact 126, and thence by a conductor 190, the closed relay 186, a conductor 191, and a conductor 192 to the solenoid of an electrically operated motor reversing switch 193, and thence through a conductor 194 to the supply conductor S2, thereby closing the switch 193.

With the switch 193 closed, three-phase current for actuating the motor 130 in a predetermined direction is drawn from the line conductors L1, L2 and L3 through the switch 183 and the supply conductors S1, S2 and S3 as follows. From the supply conductor S1, a conductor 196 leads to a conductor 197 which is connected by the closed switch 193 to a conductor 198 that connects with a conductor M1 leading to the motor 130. From the supply conductor S3, the circuit leads through a conductor 201 that is connected by the closed switch 193 to a conductor 202, and thence by a conductor M3 leading to the motor. From the supply conductor S2, the circuit leads through the conductor 194, a conductor 204, and interrupting switches 205 and 206, to a conductor M2 leading to the motor. The motor 130 then operates to adjust the transmission mechanism 83 until the predetermined feed rate is reestablished, whereupon the contacts 128 and 126 move out of engagement and the motor stops.

When the variable speed contact 128 is moved into engagement with the other standard speed contact 127, with the lever 168 in the same position, a different circuit is completed, leading from the supply conductor S3 through the conductor 188 and the contact 128 to the contact 127, and by a conductor 210, the closed relay 186, a conductor 211 and a conductor 212 to the solenoid of another motor reversing switch 213 and thence by a conductor 214 to the supply conductor S2, thereby closing the switch 213. With the switch 213 closed, the supply conductor S1 is now connected, by the conductor 196 and the switch 213, to a conductor 203 and the motor conductor M3; and the supply conductor S3 is connected through the conductor 201, a conductor 215 and the switch 213 to a conductor 216 and the motor conductor M1 thereby interchanging two phases of the motor circuit and causing the motor to operate in the direction opposite from that in which it operates when the contact 126 is engaged and the switch 193 is closed.

If the lever 168 is now moved to the left to actuate the spindle 40 in the opposite direction, the circuit reversing switch 182 is opened and the circuit reversing switch 181 is closed, thereby deenergizing the solenoid of the relay 186 and establishing a circuit from the supply conductor S1 through the conductor 184, the closed switch 181, and a conductor 217 to the solenoid of another relay 218 and thence to a conductor 219 which connects with the conductor 187 leading to the supply conductor S2. This results in opening the relay 186 and closing the relay 218. With the relay 218 closed, the contacts 126 and 127 on the constant speed element 109 are connected to the solenoids of the motor reversing switches in opposite manner, so that the contact 126 controls the motor reversing switch 213 while the contact 127 controls the motor reversing switch 193. As shown, the circuit from the contact 126 then extends through the conductor 190 and a conductor 220 to the closed relay 218 and thence to the conductor 212 which leads to the solenoid of the switch 213. The circuit from the contact 127 then extends through the conductor 210 and a conductor 221 to the closed relay 218 and thence to conductor 192 which leads to the solenoid of the switch 193. When the variable speed contact 128 is now moved into engagement with either of the contacts 126 or 127, a regulating effect opposite to that previously described is obtained. By this arrangement, the action of the variable speed transmission regulating motor 130 is so controlled as to compensate for variations in the speed of the guiding surfaces of the pattern 44 in the correct direction regardless of the direction of rotation of the pattern.

Although the described control system is illustrated as functioning to maintain the cutting action of a pattern controlled machine tool substantially constant at the most effective feed rate, as predetermined by adjustment of the rate changing mechanism, it is to be understood that the speed controlling system may be used to advantage in effecting speed control for various other purposes. Furthermore, it may be adapted to effect variable speed operation of one machine element in accordance with the varying speeds of another machine element or in accordance with the speeds established by a controlling element operative to effect a predetermined speed changing sequence.

The two movable elements 108 and 109 of the electrical control unit 113 each comprises a body portion preferably formed of insulating material as indicated in Figs. 7, 11 and 14 of the drawings. As shown, the variable speed element 108 of the unit 113 comprises a plate or disc 225 of insulating material carrying on its periphery a slip ring 226 that is electrically connected to the intermediate contact element 128, which is mounted on the face of the disc, a brush 227 being provided in slidable contact with the ring 226 for establishing connection between it and the control conductor 188. The constant speed element 109 of the control unit comprises a cylinder 230 of insulating material carrying the contact elements 126 and 127 in arcuately spaced relation on its forward face and having on its periphery a pair of spaced slip rings 231 and 232 electrically connected with the contacts 126 and 127 respectively, as shown in Figs. 7 and 14, and slidably engaged by brushes 234 and 235, respectively connected to the control conductors 190 and 210.

As appears in Figs. 11, 12 and 13, the several brushes 227, 234 and 235 are mounted, by means of insulating supports, on the interior of a housing 236 formed in the front of the machine bed 21 and arranged to enclose the rotating elements of the electrical control unit 113. As shown in Figs. 11 and 13, the variable speed element 108 is carried by a relatively light shaft 237 extending through the insulating disc 225 and supported at its ends on pivot points for free rotation, its forward end carrying a sprocket wheel 238 which is engaged by the driving chain 112. The chain 112 extends upwardly from the sprocket 238 within a hollow arm or bracket 240 that is pivotally mounted on the front of the machine co-axially with the shaft 237 as shown in Figs. 2 and 11. At its upper end, the arm 240 carries the governing roller 111, as shown in Fig. 9, the roller being fixed on a shaft 241 mounted on pivot points for free rotation and that carries a sprocket 242 which engages the chain 112 extending upward from the sprocket 238. The chain 112 thereby effects a driving connection between the roller 111 and the variable speed element 108, the arrangement being such that the roller and the variable speed element rotate freely and in synchronism in manner to respond quickly and accurately to the slightest change in the speed of rotation of the follower roller 45 and the corresponding roller 110.

As appears in Fig. 9, the follower roller 45 and the corresponding roller 110 are removably mounted on opposite ends of a short shaft 245 journalled in the bracket 46, the arrangement being such that both of these rollers may be removed readily whenever the cutter 43 is changed in order that they may be replaced by rollers corresponding exactly in diameter to the diameter of the new cutter thereby maintaining the predetermined relationship between the pattern and the speed controlling mechanism. The governing roller 111, being mounted on the upper end of the pivoted arm 240, may be adjustably positioned to engage with a roller 110 of any diameter, and a spring urged plunger 246, mounted on the front of the machine as shown in Figs. 2 and 9, is disposed to engage the arm 240 in manner to press the governing roller 111 into contact with the roller 110 with sufficient force to establish frictional driving connection between them. Although in the particular construction shown, it is preferable to utilize the auxiliary corresponding roller 110, it is to be understood that the governing roller 111 may be applied directly to the periphery of the follower roller 45 whenever the construction of the machine favors that arrangement.

The insulating cylinder 230 of the standard speed element 109, which carries the contacts 126 and 127 of the control unit 113, is mounted on the forward end of a shaft 250 that is journalled in the rear wall of the housing 236, as shown in Fig. 11. At its inner end, the shaft 250 is operatively connected, by means of a torque limiting coupling or slip clutch 251, to a sprocket 252 which is driven from the rate changing mechanism 122 at the predetermined standard rate by means of the chain 123.

In order to control the sensitivity of response of the electrical control unit 113, the contact 126 of the constant speed element 109 is adjustably mounted for arcuate movement relative to the contact 127 along the face of the insulating cylinder 230, by means of a retaining bolt 254 operating in a slot 255, as shown in Fig. 12. By moving the contact 126 close to the contact 127, the range of movement of the intermediate contact 128 may be so reduced that the slightest variation in the speed of the element 108 from that of the constant speed element 109 causes the contact 128 to engage one or the other of contacts 126 and 127, whereby very close regulation of the speed changing transmission mechanism may be achieved, if desired. On the other hand, should it be considered desirable that the regulating motor 130 be energizing less frequently in effecting the regulating operation, the contact 126 may be set farther from the contact 127 to afford a greater range of movement to the intermediate contact 128.

In the event that the driving action of the governing roller 111 should be discontinued, either through moving the pattern 44 out of engagement with the follower roller 45 or through disconnecting the work spindle drive by moving the reversing clutch gear 89 to neutral position, while the constant speed element 109 of the control unit continues to rotate, one of two conditions will result; either the variable speed element 108 and the governing roller 111 will be driven by the rotating element 109, or, should the roller 111 be prevented from turning by engagement of the pattern 44 with the follower roller 45 or like reason, the overload clutch 251 will slip, thereby preventing excessive torque being exerted upon the control unit. Under either of these conditions, the contact 128 will remain engaged with either the contact 126 or 127 and the regulating motor 130 will tend to run continuously until the speed changing mechanism 83 has been adjusted to one or the other extreme position, whereupon the motor 130 will stall if not otherwise stopped.

Since unintentional adjusting of the mechanism 83 to an extreme position is undesirable, the previously mentioned interrupting switch 205 is arranged to be actuated by the plunger 161 of the exhaust valve 157 as shown in Figs. 8 and 9, in such manner that whenever the pattern 44 moves out of contact with the follower roller 45 the switch 205 will be opened, thereby deenergizing the motor 130 and preventing it from operating in response to engagement of the contacts in the control unit. Likewise, the motor 130 is deenergized whenever the driving connection to the pattern 44 is disconnected by moving the reversing clutch gear to neutral position, since both of the reversing switches 181 and 182 are then moved to open position as indicated in Figs. 7 and 8, thereby deenergizing the relays 186 and 218 and disconnecting the control unit 113 from the switches controlling the motor 130.

Furthermore, the other previously mentioned interrupting switch 206 is arranged to be actuated by the main clutch lever 59, as shown in Figs. 1, 2 and 4, the arrangement being such that when the lever 59 is positioned to disengage the main clutch 58 thereby stopping the work spindle 40, the switch 206 is opened to deenergize the motor 130 to prevent its operation should the contacts happen to stop in engaged position. Likewise, when the machine is stopped by opening the main motor switch 183 the regulating motor 130 is automatically deenergized and prevented from shifting the speed changing adjusting mechanism to an extreme position, since both the main motor and the regulating motor are energized from the line conductors L1, L2 and L3 through the main switch.

As shown in Fig. 9, the control plunger 161 of the exhaust valve 157 is mounted in a valve casing 257 formed integrally with the follower roller bracket 46, the plunger being urged outwardly by a spring 258 toward the open position. As appears in Figs. 9 and 10, the operating shoe 162 on the plunger 161 presents an angular or inclined, curved surface to the edge of the pattern 44, the shoe being disposed in such manner that before the pattern may move into engagement with the follower roller 45 it must engage the shoe 162 and force it aside in opposition to the spring 258. This results in moving the plunger 161 of the exhaust valve 157 to closed position thereby reducing the speed of travel of the table 38 and in closing the interrupting switch 205 in the motor circuit to render the regulating motor 130 operative, as previously explained.

In order that the shoe 162 may be adjusted relative to the supporting shaft 245 so that it may be disposed at a predetermined distance from the follower roller 45 whatever the diameter of the roller may be, the shoe is fitted with slots 259, Figs. 9 and 10, which receive clamping screws 260 threaded into a plate 261 fixed on the outer end of the valve plunger 161. In changing the follower roller 45 to correspond with a new cutter 43, the original roller is first removed from the shaft 245 after which the screws 260 may be loosened and the new roller then placed temporarily in position on the shaft. The shoe 162 may then be adjusted to the desired position relative to the surface of the roller and the roller withdrawn to permit tightening the screws 260. After the screws have been tightened, the roller 45 may be replaced on and securely fixed to the shaft 245 by means of a nut 263, the screws 260 then being protected by the body of the roller from injury or from tampering.

In the modified construction shown in Fig. 15, the work spindle 40 is driven by means of a relatively long worm 268 that is journalled in axially fixed position in the base 21, in place of the previously described short worm 98 carried by the slidably mounted table of the machine shown in Fig. 1. As shown, the long worm 268 meshes with a worm wheel 269 that is fixed on the work supporting spindle 40, the arrangement being such that the worm wheel 269 may move along the worm 268 in the manner of a nut moving along a screw, or of a gear rolling upon a rack, the worm being long enough to accommodate the full range of movement of the work table in sliding along the base 21. This arrangement is particularly advantageous in machining workpieces from patterns having portions disposed at steep angles to the direction of rotation of the work table, especially if the angle of the pattern is so steep that further rotation of the spindle 40 will be prevented when the steep portion engages the follower roller. Under these conditions, the long worm and worm wheel of this modification will act as a screw and nut mechanism or differential device, exerting a reaction force in opposition to the normal hydraulic feeding force to withdraw the table to the right, thereby moving the work supporting spindle 40 away from the cutter. When the table is thus retracted by the screw and nut action, the pattern will move substantially radially until the steep portion has traversed the follower roller, and further rotation of the spindle 40 becomes possible. The worm and wormwheel will then resume their normal action in rotating the spindle 40, and the table will again be urged to the left as before by the normal feeding force.

Since the screw and nut action of the worm and worm wheel is exerted in the direction to move the pattern and workpiece outwardly or away from the follower roller and cutter, the worm 268 is restricted to rotation in one direction only. Accordingly, it is not necessary to provide reversing mechanism for the work spindle drive, and the transmission mechanism is correspondingly simplified. As shown, the long worm 268 is driven from the variable speed driving mechanism 83, by means of a worm 271 carried on the out-put shaft 84 of the mechanism and meshing with a worm wheel 272 on a horizontally disposed shaft 273 journalled in the base 21. The shaft 273 has slidably keyed thereon a clutch sleeve 274 which may be selectively engaged with a clutch gear 275 rotatably mounted on the shaft 273. The clutch gear 275 meshes with an idler gear 276 which in turn meshes with a gear 277 mounted on the end of the worm 268. Since the work spindle 40 is not reversible, if reversal in the direction of the cutting action is required, it may be effected by reversing the direction of rotation of the cutter spindle 24, suitable reversing gearing for this purpose being well known.

In this construction, a modified work supporting table 278 is provided, having formed integrally with it a hydraulic cylinder 279 that fits over and cooperates with a piston element 280 which is fixed on the bed 21 by a fastening bolt 281. When the machine is in operation, hydraulic pressure within the cylinder 279 yieldably forces the table 278 to the left to bring the pattern and workpiece into engagement with the follower roller and the cutter, respectively, as in the machine previously described.

For illustrating the operation of this modification, the work spindle 40 of the machine is shown equipped with a pattern 284 presenting a steep, substantially radial or perpendicular guiding surface portion 285 of the type which the usual automatic pattern controlled machine is unable to reproduce. In this arrangement, the worm and worm wheel mechanism functions to turn the work spindle 40 and the pattern 284 in counterclockwise direction as seen from the front of the machine in Fig. 15, until the steep portion 285 of the pattern is turned downward into engagement with the follower roller. Further rotation of the pattern and work spindle is then prevented, since the portion 285 does not exert a radial component of force upon the follower roller to move the table back to the right against the force exerted by the hydraulic pressure in the cylinder 279. When this condition occurs, the reaction force exerted by the rotating worm 268 upon the worm wheel 269 forces the table 278 to the right against the hydraulic pressure in the cylinder 279 thereby drawing the steep portion 285 along the follower roller, radially of the pattern. Since the worm and worm wheel mechanism continues to exert torque upon the spindle 40, rotation of the spindle will be resumed as soon as the steep portion 285 of the pattern passes over the follower roller. From this explanation it should be apparent that this modification provides a machine that will operate upon patterns having steep angular or radial portions which cannot be reproduced by pattern and follower mechanisms of the usual type. Although the steep surface portion 285 of the pattern 284 is shown as disposed along a radial line to simplify the explanation of the operation, it is to be understood that this machine is actually capable of following an undercut or reversely curved surface, since the spindle 40 may be rotated backwards in clockwise direction if necessary, by the reaction force exerted by the follower roller upon the pattern, the worm wheel 269 then rolling to the right along the worm 268 as a gear rolling upon a rack. In this case the control mechanism functions automatically to reduce the speed of rotation of the worm 268 to compensate for the feeding movement effected by the rolling action of the worm wheel upon the worm.

Control of the operation of the work supporting spindle 40 in this modified machine may be effected by means of a hand lever 288 mounted on the front of the machine base, and operatively connected to actuate a longitudinally movable control rod 289 carrying a shifting fork 290 that operates the slidable clutch sleeve 274. The control rod 289 is further provided with a valve portion 292 arranged in such manner that when the lever 288 is moved to the left to engage the clutch sleeve 274 with the clutch gear 275 to drive the spindle 40, the valve 292 will establish communication from a pressure pump 293 to a conduit 294 leading to the cylinder 279, for forcing the workpiece into engagement with the cutter 43. When the lever 288 is moved to the right to the position shown, for stopping the machine, the clutch 274 is disengaged and the valve is moved to permit the pressure fluid within the cylinder 279 to escape through the conduit 294 into an exhaust conduit 295. After the driving clutch has been disengaged and the pressure in the cylinder 279 relieved, the workpiece and pattern may be retracted from the cutting zone by moving the table 278 to the right manually. For this purpose the forward end of the work spindle 40 is provided with a large hand wheel 298 by means of which the spindle may be turned in such manner that the worm wheel 269 rolls upon the worm 268, the liquid in the cylinder 279 meanwhile escaping through the exhaust conduit 295 to permit movement of the table to the right.

The governing mechanism for regulating the speed of rotation of the work spindle driving mechanism in this modified construction may be substantially the same as that previously described, with the exception that since reversal in the direction of rotation is not required, the electrical circuit may be simplified, as shown in Fig. 16, by omitting the reversing relays. As there shown, the contact 126 of the standard speed element is connected directly and permanently, by means of its slip ring 231 and brush 234, to a conductor 301 leading to the solenoid of the motor controlling switch 193. Likewise the contact 127 is directly and permanently connected, by means of its slip ring 232 and brush 235, to a conductor 302 leading to the solenoid of the other motor controlling switch 213. The motor circuit is provided with the disconnecting switches 205 and 206, the switch 205 being in this instance mounted as shown in Fig. 15, in position to be engaged by the end of the control rod 289 and arranged to be closed for energizing the motor 130 when the lever 288 is moved to engage the spindle driving clutch 274.

Although the work forming or finishing tools used in both embodiments of the invention are shown in Figs. 3, 4, 5 and 15 as being milling cutters, any other suitable material removing or forming tool may be utilized, as for example a grinding wheel 303 such as is illustrated in the modified construction shown in Fig. 6. In this structure, the grinding wheel is mounted on a high speed spindle 304 extending through and journalled in a modified quill 305 and driven by an independent motor 306 mounted directly on the end of the quill. The quill 305 may be substituted in the machine for the standard quill 25 and positioned therein with the grinding wheel 305 aligned with the follower roller 45 in the same manner that the cutter 43 is normally positioned, as previously described. For light grinding work, the standard quill 25 and spindle 24 may be provided with bearing elements for supporting a small grinding wheel and driving motor, the grinding spindle being disposed through the hollow tool spindle 24.

The grinding action of the wheel 303 will follow the contour of the pattern 44 in manner to accurately reproduce the shape of the pattern and to form on the workpiece 42 a uniform finish by reason of the uniform rate of feeding movement established by the governing mechanism 50, as previously explained. Under some conditions of operation it may be desirable to take a preliminary cut with a milling cutter, then remove the milling cutter supporting structure and replace it with the grinding wheel supporting unit for effecting finish grinding of the workpiece, the exchange of apparatus being effected without disturbing the general arrangement, other than to provide a follower roller corresponding in diameter to the grinding wheel.

Although the arrangement of the pattern and follower relative to the workpiece and cutter herein set forth is preferred as the simplest and most readily maintained system, it is to be understood that pattern and follower combinations of other sizes and otherwise arranged may be designed to accomplish the same results, and that under some circumstances it may be preferable to utilize an enlarged, specially designed pattern or other special arrangement to meet particular requirements. Such special patterns, however, necessarily differ somewhat in contour from the workpiece required, and changes in the conditions of operation, such as may result from grinding the cutter to sharpen it thereby reducing its diameter, may necessitate redesigning the pattern and follower combination, whereas in the preferred combination shown, in the event that the cutter is reduced in diameter by grinding, it is merely necessary to reduce the diameter of the follower roller a like amount to completely compensate for the change.

Either the machine shown in Fig. 1 or the machine shown in Fig. 15 may be operated to perform continuous rotary milling or grinding operations. As shown in Fig. 3, the workpieces 42 are arranged about the rotary fixture 41 in such manner that while one piece is engaged with the cutter 43 another previously finished piece may be replaced by an unfinished workpiece, the fixture rotating continuously meanwhile. The particular workpieces 42 shown require finishing to exactly the same contour on both sides, consequently after one side has been finished the piece may be turned over to present the second side to the cutter. By this combination of the continuous rotary milling process with the feed rate controlling system set forth herein, pattern controlled finishing operations may be performed in highly efficient manner.

From the foregoing description of the construction and operation of illustrative pattern controlled machine tools operating in accordance with the principles of this invention, it is apparent that there has been provided improved pattern controlled work forming apparatus that functions to machine workpieces of unusual shape and to regulate the relative feeding movement of the workpiece and the work forming tool automatically in such manner as to effect the most efficient operation of the tool and to form on the workpiece a finished surface of uniform character throughout.

Although the foregoing detailed description and the accompanying drawings are directed specifically to particular apparatus exemplifying preferred constructions for the purpose of fully disclosing operative embodiments of the invention, it is to be understood that the particular structures shown and herein described are intended to be illustrative only, and that various features of the invention may be incorporated in other forms and constructions without departing from the spirit and scope of the invention as defined in the subjoined claims.

The principles of the embodying apparatus having now been fully explained, we hereby claim as our invention:

1. A pattern controlled milling machine comprising a base, a milling cutter rotatably mounted on said base, means to drive said milling cutter at constant speed, a work carrying table slidably mounted on said base, a workholding fixture rotatably mounted on said table, a guiding template of predetermined shape and size rotatably mounted on said table, means to rotate said workholder and said guiding template in synchronism, a follower roller of diameter equal to that of said milling cutter rotatably mounted on said base in position to engage with and roll upon the guiding surface of said guiding template in manner to position a workpiece in said workholder in cutting relationship with said milling cutter, means biasing said slidable work table in direction to maintain said template in engagement with said follower roller, and governing means responsive to variations in the speed of rotation of said follower roller and operative to control the speed of rotation of said workholder in manner to maintain the rate of feeding movement of the surface of said workpiece relative to said milling cutter constant regardless of the shape of the surface being machined.

2. In a pattern controlled machine tool for forming a surface of irregular contour, the combination with a material forming tool and a workholder arranged for relative movement, of means for effecting relative feeding movement between said tool and a workpiece carried by said workholder, a pattern and cooperating follower operatively arranged to guide said relative feeding movement in maner to form the surface of said workpiece to a predetermined contour, a control element operatively connected to rotate in accordance with the linear speed of the guiding surface of said pattern at the point of engagement with said follower, a cooperating control element arranged to rotate at a predetermined standard speed, and control means responsive to variations in the relative speed of rotation of said control elements and operative to govern said relative feeding rate in manner to maintain a predetermined rate of progression between said tool and said workpiece.

3. In a pattern controlled machine tool, the combination with a cutter disposed to engage a workpiece, of a pattern for guiding said cutter, a follower roller of diameter equal to that of said cutter disposed to engage and roll upon said pattern in manner to control the relative movement of said cutter and a workpiece, and a governor arranged to be actuated by rotation of said follower roller and operative to regulate the rate of relative movement of said cutter and said workpiece.

4. In a machine tool, the combination of a rotatable work support, a tool support bodily movable relative to said work support, transmission mechanism for effecting simultaneous rotary and bodily movement of said supports including adjustable rate change means, means determining the combined path of movement resulting from said relative rotary and bodily movements including a pattern and a tracer member contacting and traversing said pattern, power operable means for adjusting said rate change means, and control apparatus arranged to be actuated in response to movement of said tracer over the surface of said pattern and operative upon said adjusting means in accordance with variations in the rate of movement of the point of contact of said tracer member relative to the contacted surface of said pattern in manner to maintain said rate of movement substantially constant, whereby the rate of cutting action of a tool in said tool support upon a workpiece on said work support may be maintained substantially constant.

5. In a machine tool, the combination of a rotatable work support, a tool support bodily movable relative to said work support, transmission mechanism for simultaneous rotary and bodily movement of said supports including adjustable rate change means, means determining the relative rotary and bodily movements including a pattern and a tracer member contacting and traversing said pattern, power operable means for adjusting said rate change means, rate control means including a member driven at predetermined rate and a member driven at a rate variable at least in part in accordance with variations in the rate of movement of the point of contact of said tracer member relative to the contacted surface of said pattern, and means controlling power operation of said adjusting means in accordance with variations in the relative rate of said rate control members.

6. In a machine tool, the combination of a tool support and a relatively movable work support, a contoured pattern, a tracer device including a tracer member contacting said pattern and movable relative thereto in manner to follow the contour thereof, transmission mechanism for effecting relative movement of said supports and of said pattern and tracer member including an adjustable rate changer, means controlling said transmission for effecting said relative support movement in accordance with the relative movement of said pattern and tracer member whereby a tool carried by said tool support will copy said pattern contour on a workpiece carried by said work-support, power operable means for adjusting said rate changer, and means responsive to movement of said tracer member over said pattern member and operative to control said power operations of said adjusting means in accordance with variations in the rate of movement of the point of contact of said tracer member relative to the contacted surface of the pattern in manner to maintain said rate of movement substantially constant, whereby the rate of cutting action between a tool on said tool support and a workpiece on said work support may be maintained substantially constant.

7. In a milling machine, the combination of a work support and a relatively movable cutter support, transmission mechanism for support movement including adjustable rate change means, mechanism controlling said transmission for effecting pattern controlled movement of a workpiece carried by said work support while contacting a rotary cutter carried by said tool support including relatively movable pattern and tracer members determinative of the path of said pattern controlled movement, power operable means for adjustment of said rate change means, and means responsive to changes in the rate of relative movement between said pattern and tracer members and serving to control operation of said power operable means in manner to vary the adjustment of said rate changer in accordance therewith to maintain constant the rate of feed movement of the cutter contacting portion of the workpiece.

8. In a machine tool, the combination of a tool support and a work-support relatively movable in a plurality of mutually transverse paths, transmission mechanism for simultaneous support movement in each of said paths including an adjustable rate changer, reversibly power operable adjusting means for said rate changer, a rate control element driven at a rate varying at least in part in accordance with variation in support movement in each of said paths, a rate control element driven at predetermined rate, and control means effecting the power operation of said adjusting means in one direction when the first mentioned control element moves at a slower rate than the other element, and effecting power operation of said adjusting means in the other direction when said first mentioned control element moves at a faster rate than said other element.

9. In a machine tool, the combination of a tool support and a work-support relatively movable in a plurality of mutually transverse paths, adjustable rate change means connected for simultaneous support movement in both said paths, power operable means for adjusting said rate change means, and means controlling said power operable means in part in accordance with the rate of support movement in one of said paths and in part in accordance with the rate of support movement in the other path.

10. In a machine tool, the combination of a tool support and a work-support relatively movable in first and second mutually transverse paths, transmission means for simultaneous support movement in both said paths including rate change means adjustable to change the rate of movement in at least one of said paths, pattern and tracer means, control means for said transmission operative from said pattern and tracer means for determining the relative movement in said first and second paths whereby to effect a pattern controlled third path of movement, power operable means for adjusting said rate change means, and means controlling the power operation of said adjusting means at least in part in accordance with variations in the rate of movement in said third path.

11. In a pattern controlled machine tool, the combination with a pattern supporting and work supporting member and a forming tool arranged for relative movement, of transmission mechanism for effecting relative movement of said member and said tool selectively at feed rate or at rapid traverse rate, a second transmission mechanism for effecting relative movement of said member and said tool at a governed feeding rate, means to regulate said second transmission mechanism automatically, and means operative when said first transmission mechanism is effecting movement at rapid traverse rate to prevent operation of said automatic regulating means for governing said second transmission mechanism.

12. In a pattern controlled machine tool, the combination with a pattern and a follower, of a variable speed drive mechanism for effecting relative movement between said pattern and said follower, governing means for controlling said variable speed drive mechanism to regulate the rate of said relative movement automatically, means for reversing the direction of operation of said drive mechanism, means for reversing the effect of said governing means, and a control system operative to actuate simultaneously said drive mechanism reversing means and said governor reversing means.

13. In a machine tool the combination of a rotatable work support, a tool support bodily movable relative to said work support, transmission mechanism for simultaneous rotary and bodily movement of said supports including adjustable rate change means, means determining the relative rotary and bodily movements including a pattern and a tracer member contacting and traversing said pattern, power operable means for the adjustment of said rate change means, rate control means including a member driven at predetermined rate and a member driven at a rate variable at least in part in accordance with variations in the rate of movement of the point of contact of said tracer member relative to the contacted surface of the pattern, means controlling power operation of said adjusting means in accordance with variations in the relative rate of said rate control members, and means for effecting simultaneous reversal of said rotary movement, of said rate control member driven at predetermined rate and of the direction effect of said means controlling power operation of said adjusting means.

14. In a machine tool, the combination of a work support and a tool support relatively movable in a plurality of transverse paths, a feed rate transmission for simultaneous support movement in both of said paths, said supports being relatively movable toward and from a cutting position, a pattern and a tracer member mutually contacting when said supports are in said cutting position to determine the relative support movement in said transverse paths, a quick traverse rate train for said support movement toward and from said cutting position, and means operative to reduce the rate effect of said train prior to the contact of said tracer and pattern members during said movement toward the cutting position, said rate reducing means including a control member shifted to rate reducing position by contact with said pattern member.

15. A pattern controlled machine tool, comprising a base, a cutter rotatably mounted on said base, a work and pattern carrying slide movably mounted on said base in cooperative relationship with said cutter, power means disposed to move said slide selectively at either a fast rate or a slow rate, control means for engaging said power means to move said slide at said fast rate in direction to advance a workpiece thereon toward said cutter, and control means disposed to be operated by a pattern carried by said slide to reduce the speed of movement of said slide to said slow rate when said workpiece approaches said cutter to avoid shock upon engagement thereof.

16. In a machine tool, the combination of a tool support and a relatively movable work support, a transmission for said relative movement including a hydraulically operable piston device and a pump providing fluid for operation of said device, means limiting said relative movement in each of opposite directions thereof, reverser valve means shiftable for effecting either of said opposite directions of relative movement, and outlet control means for said piston device operative in either direction position of said reverser valve means to effect a quick traverse rate of said relative movement followed by a relatively slow rate before operation of said limiting means.

17. In a machine tool, the combination of a tool support, a rotatable work support bodily movable relative to said tool support, a worm wheel for rotation of said work support, a worm engaging said worm wheel in a manner to simultaneously effect both said work support rotation and said bodily movement, power means connected for driving said worm, and means determinative of the relative rotational and bodily movement of said work support, the last mentioned means including a pattern fixed for rotation with said work support and a tracer member traversing said pattern.

18. A pattern controlled machine tool comprising a bed, a driving worm rotatably mounted in said bed, a table slidably mounted parallel with said worm, a worm wheel rotatably mounted on said table in engagement with said driving worm, a pattern carried by said table and connected to be rotated by said worm wheel, a follower on said bed disposed to engage said pattern, means to urge said table in direction to move said pattern into engagement with said follower and means to drive said worm in direction to exert thrust upon said worm wheel in opposition to said means urging said pattern into engagement with said follower, whereby should said follower prevent rotation of said pattern the thrust exerted by said worm will retract said pattern until rotation thereof is again permitted.

19. A drive mechanism for a machine element arranged to be turned in contact with an object offering variable resistance to said turning movement, means urging said element into contact with said object, a worm wheel carried with said machine element and operatively connected to turn it, a worm engaging said worm wheel for driving it, and means to drive said worm in direction to exert reaction force on said worm wheel in opposition to said urging means, whereby when the resistance offered by said object prevents turning movement of said machine element said reaction force will function to retract said element from said object.

20. In a machine tool, the combination of a tool support, a rotatable work support bodily movable relative to said tool support, adjustable rate change means, a differential device connecting said rate change means for both said rotary and bodily movement in a manner to effect either movement, means controlling the relative rotary and bodily movement of said work support including mutually contacting pattern and relatively movable tracer members, and power means for adjustment of said rate changer in accordance with variations in the rate of movement of the contacting point of the surface of said pattern.

21. In a pattern controlled machine tool for forming a surface of irregular contour, the combination with a material forming tool and a work holder arranged for relative movement, of means for effecting relative feeding movement between said tool and a workpiece carried by said work holder, a pattern and cooperating follower operatively arranged to guide said relative feeding movement in manner to form the surface of said workpiece to a predetermined contour, a control element operatively connected to rotate in accordance with the linear speed of the guiding surface of said pattern at the point of engagement with said follower, a cooperating control element arranged to rotate at a preselected standard speed, a rate changing mechanism operatively connected to drive said standard speed element and adjustable to select said standard speed, and control means responsive to variations in the relative speed of rotation of said control elements and operative to govern said relative feeding rate in accordance with the adjustment of said rate changing mechanism.

22. In a pattern controlled machine tool, a base, a cutter rotatably supported by said base, a work and pattern supporting slide movably mounted on said base, a work and pattern carrying spindle rotatably mounted on said slide, a follower roller rotatably mounted on said base in position to engage and roll upon the guiding surface of a pattern on said spindle, means to rotate said spindle to turn said pattern in engagement with said follower roller and to turn a workpiece in feeding engagement with said cutter, and control means responsive to changes in the rate of rotation of said follower roller and operative to regulate the rate of feeding movement of said workpiece relative to said cutter.

23. In a machine tool, the combination of a tool support and a work support relatively movable in first and second mutually transverse paths, transmission means for simultaneous support movement in both said paths including rate change means adjustable to change the rate of movement in at least one of said paths, control means determining the relative movement in said first and second paths including a pattern member and a tracer member contacting and traversing said pattern, rate control means including a plurality of elements respectively rotatable at a predetermined rate and at a rate varying at least in part in accordance with the rate of movement of the point of contact of said tracer member relative to the contacted surface of said pattern member, and means controlling the operation of said rate change adjusting means in accordance with variations in the relative rate of said elements, said controlling means operating said adjusting means in a speed reducing direction when said element having a predetermined rate rotates at a rate relatively slower than the other element, and vice versa.

24. In a machine tool, the combination of a rotatable work support, a tool support bodily movable relative to said work support, transmission mechanism for simultaneous rotary and bodily movement of said supports including adjustable rate change means, means determining the relative rotary and bodily movements including a pattern and a tracer member contacting and traversing said pattern, power operable means for the adjustment of said rate change means, interruptible means controlling power operation of said adjusting means at least in part in accordance with variations in rate of movement of the point of contact of said tracer member relative to the contacted surface of said pattern, a quick traverse rate train for movement of one of said supports, a controller member shiftable for operatively connecting said quick traverse rate train, and means interrupting said interruptible means when said controller member is in a position effecting said quick traverse rate.

25. In a machine tool, the combination of a rotatable work support, a tool support bodily movable relative to said work support, transmission mechanism for simultaneous rotary and bodily movement of said supports including adjustable rate change means, means determining the relative rotary and bodily movements including a pattern and a tracer member contacting and traversing said pattern, power operable means for the adjustment of said rate change means, interruptible means controlling power operation of said adjusting means at least in part in accordance with variations in the rate relative to the surface of said pattern of the contacting point of said tracer member, and means for interrupting said interruptible means including a control member shiftable to interrupting position upon relative movement of said pattern and tracer member to noncontacting positions.

26. In a machine tool, the combination of a tool support and a relatively movable work support, a contoured pattern, a tracer device including a tracer member contacting said pattern and movable relative thereto to follow the contour thereof, transmission mechanism for effecting relative movement of said supports and of said pattern and tracer member including an adjustable rate changer, means operative to effect said relative support movement in accordance with the relative movement of said pattern and tracer member whereby a tool carried by said tool support will copy said pattern contour on a workpiece carried by said work support, power operable means for adjusting said rate changer, a rate control member driven at predetermined rate, another rate control member driven at a rate variable at least in part in accordance with variations in the rate of movement of the point of contact of said tracer member relative to the contacted surface of the pattern, and means controlling the power operation of said adjusting means in accordance with variations in the relative rate of said rate control members.

27. In a machine tool, the combination of a work support and a relatively movable tool support, a support transmission including an adjustable rate changer, power operable means for adjusting said rate changer, a rate control member driven at predetermined rate, means reversibly controlling the operation of said adjusting means at least in part in accordance with variations in the rate of one of said supports relative to the rate of said member, and reverser means simultaneously operative to reverse the direction of movement of said support and of said member and also to reverse the direction of effect of said controlling means.

28. In a machine tool, the combination of a tool support and a work support relatively movable in mutually transverse paths, transmission mechanism for simultaneous support movement in both said paths whereby to effect a third path of relative movement, said transmission including rate change means adjustable for varying the rate in at least one of said paths, power operable means for adjustment of said rate change means, and means controlling power operation of said adjusting means at least in part in accordance with variations in the rate of movement in said third path.

29. In a machine tool, the combination of a work support and a relatively movable tool support, a support transmission including an adjustable rate changer, power operable means for adjusting said rate changer, a rate control member driven at predetermined rate, means controlling the operation of said adjusting means at least in part in accordance with variations in the rate of one of said supports relative to the rate of said member, and reverser means simultaneously operative to reverse the direction of movement of said rate control member and of the last mentioned support.

30. In a machine tool the combination of a tool support, a rotatable work support bodily movable relative to said tool support, a feed rate transmission for simultaneously effecting said bodily and rotary movements, relatively rotatable pattern and tracer members mutually contacting when said supports are in cutting position for control of said transmission to determine the relative rotary and bodily movement, a quick traverse rate train for effecting bodily support movement toward and from said cutting position, and control means for reducing the rate effect of said train during movement toward said cutting position including a shiftable member positioned in rate reducing position by contact with said pattern prior to contact of said pattern and tracer member.

31. In a pattern controlled machine tool, a base, a table slidably mounted on said base, a pattern rotatably mounted on said table, a follower on said base, means to urge said table in direction to engage said pattern with said follower, means to turn said pattern including a worm wheel carried by said table, a relatively long worm journalled in said base parallel with the direction of movement of said table and having operative engagement with said worm wheel, and means to turn said worm in direction to exert thrust on said worm wheel tending to force said pattern away from said follower, whereby should said pattern be prevented from turning by engagement of a substantially radial element of its guiding surface with said follower it will be moved radially relative to said follower by the thrust of said worm until it is again free to rotate.

32. In a machine tool provided with a pattern and follower mechanism, a pattern and a follower arranged for relative movement along two paths, yieldable pressure means exerting force urging relative movement thereof toward each other along one of said paths, and a differential mechanism operatively connected to effect relative feeding movement along the other of said paths and to exert reaction force opposing said yieldable pressure force exerting means acting along said first path, the arrangement being such that upon engagement of said follower with a steep element of said pattern said reaction force is exerted in direction tending to move said follower and pattern away from each other in manner to permit continued feeding movement therebetween.

33. In a pattern controlled machine tool, a base, a cutting tool supported by said base, a work and pattern carrying supporting member movably mounted on said base, a follower roller rotatably mounted on said base in position to engage and roll upon the guiding surface of a pattern on said support, means to actuate said work and pattern carrying support to move said pattern along said follower roller and to move a workpiece relative to said cutter, and control means responsive to change in the rate of rotation of said follower roller and operative to regulate the rate of movement of said workpiece relative to said cutter.

34. A cam milling machine for cutting a non-uniform surface on the periphery of a workpiece, comprising a rotatably mounted workholder, a rotatably mounted milling cutter disposed to engage the periphery of a workpiece carried by said workholder, means to rotate both said workholder and said milling cutter, a template connected to rotate in synchronism with said workholder, a follower roller disposed to engage and roll upon the guiding surface of said template, means to effect relative positioning of said workholder and said milling cutter in accordance with the guiding action of said template and said follower roller, and means to govern the speed of rotation of said workholder in response to change in the speed of rotation of said follower roller in such manner as to maintain constant the rate of cutting action between said milling cutter and the workpiece carried by said workholder.

35. A cam milling machine for milling cam surfaces, comprising a rotatable guiding template of predetermined size and contour, a follower roller arranged to engage and roll upon the guiding surface of said template, a workholder operatively connected to turn with said template, a milling cutter of the same diameter as said follower roller disposed to engage the periphery of a workpiece on said workholder, means for driving said milling cutter at constant speed, means for rotating said workholder and said template in synchronism, means for effecting relative movement between said milling cutter and a workpiece on said workholder in accordance with the guiding action of said follower roller in rolling upon said template, and governing means operative in response to change in the speed of rotation of said follower roller to control the speed of rotation of said template and said workholder in manner to maintain a constant cutting rate between said milling cutter and the periphery of said workpiece.

36. In a pattern controlled machine tool, a pattern and workpiece carrying structure, a follower and cutter carrying structure, said structures being relatively movable and positioned with the follower in cooperating relationship with the pattern and with the cutter in cooperating relationship with the workpiece, means exerting force to urge said structures toward each other, and a worm and worm wheel mechanism operatively connected to effect relative feeding movement between said structures for effecting a cutting operation upon said workpiece the reaction force of said worm and worm wheel being exerted in direction opposed to the force urging said structures toward each other, whereby said structures will be moved away from each other by said reaction force upon engagement of the follower with a steep contour element of the pattern.

37. In a copying machine the combination of a tool support, a rotatable work support bodily movable relative to said tool support and providing work holding devices for a series of workpieces arcuately spaced apart and positioned for the workpieces to follow one another past a tool on the tool support as the work support is rotated, transmission mechanism for effecting said bodily and rotary movements, control means for said transmission mechanism including a pattern member rotatable with said work support and a follower member engaging the pattern member to control said bodily and rotary movements, said pattern member including a plurality of portions contoured respectively for effecting a desired contour on the different workpieces and arcuately spaced apart in accordance with the spacing of the workpieces and a plurality of intervening portions each contoured to effect bodily and rotary movements following the finishing of the copying operation on a workpiece to position the supports for the start of the copying operation on the next succeeding workpiece.

38. In a copying machine the combination of a tool support, a rotatable work support bodily movable relative to said tool support and providing workholding devices for a series of workpieces arcuately spaced apart and positioned for the workpieces to follow one another past a tool on the tool support as the work support is rotated, transmission mechanism for effecting said bodily and rotary movements, control means for said transmission mechanism including a pattern member rotatable with said work support and a follower member engaging the pattern member to control said bodily and rotary movements, said pattern member including a plurality of portions contoured respectively for effecting a desired contour on the different workpieces and arcuately spaced apart in accordance with the spacing of the workpieces and a plurality of intervening portions each contoured to effect bodily and rotary movements following the finishing of the copying operation on a workpiece to position the supports for the start of the copying operation on the next succeeding workpiece, rate change means associated with said transmission mechanism and adjustable for changing the rotary speed of said rotatable support, and means for adjustment of said rate change means in accordance with variations in the rate of movement of said tool relative to said workpiece in various paths resulting from simultaneous bodily and rotary support movements while copying the contour of the first mentioned pattern portions on the corresponding workpieces.

39. In a machine tool the combination of a tool support, a rotatable work support bodily movable relative to said tool support and providing a plurality of similar workholding devices arcuately spaced apart and each positioned for similar movement past a tool on the tool support as the work support is rotated in a cutting position of said bodily movement, transmission mechanism for rotation of said work support at a feed rate, a train for said relative bodily movement at quick traverse rate toward or from said cutting position, and means operative in accordance with said bodily movement toward said cutting position to reduce the rate effect of said train prior to reaching said cutting position.

40. In a machine tool the combination of a tool support, a rotatable work support bodily movable relative to said tool support and providing a plurality of similar workholding devices arcuately spaced apart and each positioned for movement past a tool on said tool support when said work support is rotated in a cutting position of said bodily movement, a feed rate transmission for simultaneously effecting said bodily and rotary movements, relatively rotatable pattern and tracer members mutually contacting when said supports are in cutting position for control of said feed rate transmission to determine the relative rotary and bodily movement, a quick traverse rate train for effecting said relative bodily movement of said supports toward and from said cutting position, and control means for reducing the rate effect of said train prior to contact of said tracer and pattern members.

41. In a machine tool, the combination of a tool support and a work support relatively movable in a plurality of mutually transverse paths, a transmission for effecting relative movement of said supports including an adjustable rate changer, the combination of power operable adjusting means for said rate changer, a rate control train, a plurality of co-axial elements respectively rotatable through said rate control train and through said rate changer, and means reversibly controlling the power operation of said adjusting means including electric circuit means having contacts respectively associated with different of said co-axial elements, and electrical reverser means operable from said contacts.

42. In a pattern controlled machine tool, a base, a tool carrying spindle rotatably mounted on said base, a work supporting structure slidably mounted on said base, a work carrying spindle rotatably mounted on said work supporting structure in position to cooperate with said tool carrying spindle, yieldable means arranged to urge said supporting structure in direction to move said work carrying spindle toward said tool carrying spindle, driving means including a differential mechanism operatively connected to effect rotary feeding movements of said work carrying spindle, and means actuated by the reaction force of said differential mechanism and operating to exert a force in opposition to said yieldable means, whereby if said work carrying spindle resists rotation, said differential mechanism reaction force will operate to retract it from said tool carrying spindle.

43. In a machine tool, the combination with a tool support and a rotatable work support mounted for bodily movement relative to said tool support, of a worm wheel operatively connected to effect rotation of said work support, a worm disposed in engagement with said worm wheel and operative thereon both to effect rotation of said work support and to exert thrust for effecting bodily movement thereof, a pattern arranged for rotation with said work support, yieldable means disposed to urge said work support toward said tool support in opposition to the thrust of said worm, and a follower member disposed to cooperate with said pattern in manner to control the bodily movement of said work support under the opposing forces exerted by said yieldable means and said worm while it is being rotated by said worm and worm wheel.

44. In a pattern controlled milling machine, a base, a milling cutter rotatably supported on said base, a work supporting structure mounted on said base and adapted to carry a workpiece in cooperative relationship with said milling cutter, a pattern presenting a guiding surface mounted on said work supporting structure, a follower roller of diameter equal to that of said milling cutter rotatably supported on said base in position to engage said guiding surface of said pattern, power transmitting means operatively connected to effect relative movement between said work supporting structure and said milling cutter in manner to effect a milling operation on a workpiece carried by said work supporting structure in accordance with the cooperative action of the guiding surface of said pattern and said follower roller, and control means responsive to the speed of rotation of said follower roller and operative to govern said power transmitting means in manner to provide a uniform rate of feeding movement between said milling cutter and the portion of the workpiece engaged by said cutter.

45. In a machine tool of the pattern controlled type, a frame, a cutting tool operatively supported on said frame, a work carrying spindle rotatably mounted on said frame in cooperating relationship with said cutting tool, a guiding pattern carried by said frame and presenting a guiding surface, a follower contacting said guiding surface of said pattern and operative to guide the movement of said work carrying spindle relative to said cutting tool, and control means responsive to changes in the speed of movement of said pattern guiding surface and at the point of contact with said follower and operative to regulate the rate of rotation of said work carrying spindle in accordance therewith in manner to maintain the rate of feeding movement between a workpiece on said work carrying spindle and said cutting tool substantially constant.

46. In a machine tool of the pattern controlled type, a frame, a cutting tool carried by said frame, a work carrying table slidably mounted on said frame, a work and pattern carrying spindle rotatably mounted on said work table in position to present a workpiece to said cutting tool, a pattern presenting a guiding surface and fixed on said spindle, a follower mounted on said frame in position to engage said guiding surface of said pattern, means operative to urge said table in direction to press said pattern into engagement with said follower, means operative to turn said work and pattern carrying spindle to cause said cutting tool to effect a machining operation upon a workpiece in accordance with the guiding action of said pattern, and control means responsive to changes in the surface speed of said pattern at the point engaged by said follower and operative upon said spindle turning means in manner to maintain said surface speed constant thereby effecting a constant rate of feeding movement between the workpiece and said cutting tool in reproducing said pattern.

47. In a machine tool of the pattern controlled type, a frame, a cutting tool carried by said frame, a work carrying table slidably mounted on said frame, a work and pattern carrying spindle rotatably mounted on said work table in position to present a workpiece to said cutting tool, a pattern presenting a guiding surface and fixed on said spindle, a follower comprising a surface speed responsive element mounted on said frame in position to engage said guiding surface of said pattern, means operative to urge said table in direction to press said pattern into engagement with said surface speed responsive follower element, means operative to turn said work and pattern carrying spindle to cause said cutting tool to effect a machining operation upon a workpiece in accordance with the guiding action of said pattern, and control means responsive to operation of said surface speed responsive follower element in accordance with changes in the surface speed of said pattern at the point engaged by said follower and operative upon said spindle turning means in manner to maintain said surface speed constant thereby effecting a constant rate of feeding movement between the workpiece and said cutting tool in reproducing said pattern.

48. In a machine tool of the pattern controlled type, a frame, a cutting tool operatively supported on said frame, a work carrying member supported on said frame in cooperating relationship with said cutting tool, means to effect relative movement between said work carrying member and said cutting tool, a guiding pattern carried by said frame and presenting a guiding surface, a surface speed responsive follower disposed to contact said guiding surface of said pattern and operative to guide the relative movement of said work carrying member and said cutting tool, and control means responsive to operation of said surface speed responsive follower in accordance with changes in the speed of movement of said pattern guiding surface at the point of contact with said follower and operative to regulate the rate of relative movement of said work carrying member and said cutting tool in accordance therewith in manner to maintain the rate of feeding movement between a workpiece on said work carrying member and said cutting tool substantially constant.

JOSEPH B. ARMITAGE.
THEODORE F. ESERKALN.

REFERENCES CITED

The following references are of record in the file of this patent:

UNITED STATES PATENTS

| Number | Name | Date |
|---|---|---|
| 2,050,127 | Sassen | Aug. 4, 1936 |
| 2,086,915 | Kopp | July 13, 1937 |
| 2,157,471 | Armitage | May 9, 1939 |
| 2,102,227 | Sinclair | Dec. 14, 1937 |
| 1,817,036 | Kearney et al. | Aug. 4, 1931 |
| 1,812,871 | Graves | July 7, 1931 |
| 1,597,741 | Topham | Aug. 31, 1926 |
| 1,716,115 | Clark et al. | June 4, 1929 |
| 2,047,162 | Armitage | July 7, 1936 |
| 1,385,966 | Larsson | July 26, 1921 |
| 2,116,593 | Bouvier et al. | May 10, 1938 |
| 2,226,677 | Vikhman | Dec. 31, 1940 |
| 2,263,764 | Elberty | Nov. 25, 1941 |
| 2,216,550 | Ernst | Oct. 1, 1940 |
| 1,301,220 | Brinkman | Apr. 22, 1919 |
| 2,192,370 | Wildhaber | Mar. 5, 1940 |
| 1,406,866 | Horn | Feb. 14, 1922 |